(12) United States Patent
Agassi

(10) Patent No.: US 11,460,004 B2
(45) Date of Patent: Oct. 4, 2022

(54) REDUCED PROFILE WIND TOWER SYSTEM FOR LAND-BASED AND OFFSHORE APPLICATIONS

(71) Applicant: Nissim Agassi, Brooklyn, NY (US)

(72) Inventor: Nissim Agassi, Brooklyn, NY (US)

( * ) Notice: Subject to any disclaimer, the term of this patent is extended or adjusted under 35 U.S.C. 154(b) by 0 days.

(21) Appl. No.: 17/825,647

(22) Filed: May 26, 2022

(65) Prior Publication Data
US 2022/0282705 A1    Sep. 8, 2022

Related U.S. Application Data

(63) Continuation of application No. 16/584,717, filed on Sep. 26, 2019, now Pat. No. 11,384,735, which is a continuation of application No. 15/055,047, filed on Feb. 26, 2016, now Pat. No. 10,465,660.

(60) Provisional application No. 62/127,497, filed on Mar. 3, 2015.

(51) Int. Cl.
| | |
|---|---|
| *F03D 13/20* | (2016.01) |
| *F03D 13/25* | (2016.01) |
| *F03D 13/35* | (2016.01) |
| *E04H 12/20* | (2006.01) |
| *E02D 27/10* | (2006.01) |

(52) U.S. Cl.
CPC ............ *F03D 13/20* (2016.05); *E02D 27/10* (2013.01); *E04H 12/20* (2013.01); *F03D 13/22* (2016.05); *F03D 13/25* (2016.05); *F03D 13/35* (2016.05); *Y02E 10/72* (2013.01)

(58) Field of Classification Search
None
See application file for complete search history.

(56) References Cited

U.S. PATENT DOCUMENTS

| | | | |
|---|---|---|---|
| 6,713,891 B2* | 3/2004 | Kirkegaard | F03D 80/85 290/55 |
| 8,109,057 B2* | 2/2012 | Stark | E04H 12/2215 52/165 |
| 2009/0217607 A1* | 9/2009 | Stark | E02D 27/42 52/704 |
| 2011/0138704 A1* | 6/2011 | Bagepalli | E04H 12/16 52/147 |

* cited by examiner

*Primary Examiner* — Juan G Flores
(74) *Attorney, Agent, or Firm* — Alfred M. Walker

(57) ABSTRACT

A reduced profile wind tower system includes a slim cylindrical spinal core extending up vertically from a foundation. A turbine nacelle is mounted on a top end of the core. Wind turbine blades extend out from the nacelle. A plurality of axially loaded tubular arms, braced by the core, are spaced around the core and link to the core through continuous shear wings or discrete bracket assemblies. The tubular arms and shear wings extend up from said foundation. The tubular arms can be set either vertically or slightly sloped; cables may substitute for the tubular arms and a pontoon may substitute for an on ground foundation.

8 Claims, 22 Drawing Sheets

REDUCED PROFILE WIND TOWER SYSTEM FOR LAND-BASED AND OFFSHORE APPLICATIONS

RELATED APPLICATIONS

This application is a continuation of application Ser. No. 16/584,717, filed Sep. 26, 2019, which '717 application is a continuation of application Ser. No. 15/055,047, filed Feb. 26, 2016, now U.S. Pat. No. 10,465,660 B2, dated Nov. 5, 2019, and Applicant claims priority under 35 U.S.C. § 120 therefrom. This application claims benefit under 35 U.S.C. § 119(e) of provisional patent application No. 62/127,497 filed Mar. 3, 2015. The '727, '047 and '497 applications are incorporated by reference herein.

FIELD OF THE INVENTION

The present invention relates to tall wind turbine towers.

BACKGROUND OF THE INVENTION

There is a wide consensus that the world is moving toward a significant expansion in wind power generation. According to the U.S. Energy Information Administration (EIA), in 2010 wind energy accounted for about only 2% of the total electricity generated in the United States. Nonetheless, from the year 2000 to 2010, electricity generated from wind in the U.S. increased more than fifteenfold. EIA reports that American wind power topped 4% of the total U.S. power capacity in 2013. Many believe that supplying 20% of our electricity from wind is within reach by 2030.

According to the U.S. Department of Energy, in order to harvest more energy at higher altitudes where wind velocity is higher, wind towers are becoming taller. At the same time, in order to cut unit costs, wind turbines are gradually getting bigger and heavier and blades are getting longer. The Triangle Business Journal reported that "in 2000, wind turbines reached 80 meters with blades rotating, and by 2012, rotating blades reached heights of 130 meters. Allowing the height to grow beyond 180 meters could be a game changer." The following considerations, therefore, are essential:

A major component of wind power project costs is invested in the fabrication, transportation, and installation of the support structure and foundations. Reducing costs of the superstructure and foundation systems, as well as facilitating the tower's installation and transportation to the project site, is necessary in making wind power more competitive with other sources of energy.

At the present time, the most common wind tower structure is a tapered-tube construction: a conical tower of a large diameter. It is a massive and costly structure. With the trend towards taller towers, larger and heavier turbines and longer blades, the diameter of today's tower will keep getting larger and its total cost rising steeply. Its fabrication, transportation, and erection costs will disproportionally increase, hindering the effectiveness of wind power installations and rendering the present tower structure less and less viable. Today, in some markets, wind is a competitive form of energy. The innovation proposed here resolves the shortcomings of today's tower and gives wind power a greater edge to become a mainstream energy resource in a wider marketplace.

According to a report by the United States Department of Energy (DOE) Plan for 2007-2012, taller wind turbine towers can access high velocity winds because of wind shear (an increase in wind velocity as height above the ground increases). However, taller towers are more expensive and more difficult to transport and erect. To support taller towers, turbine bases must normally grow in diameter. Bases that are more than approximately 4 meters in diameter cause transport costs to skyrocket because of limitations in road capacity, bridge heights, and utility line heights.

All wind towers installed to date, whether a tapered tube or a tapering lattice structure, are essentially the same basic structural system: a free-standing vertical cantilever. Lattice tower structures have been in use in transmission lines and antenna installations for many years. Some lattice towers, in one form or another, have been used in wind tower installations. At the present time, however, the most common wind tower structure is the tapered tube, a conical tower of a large diameter. It is a massive and costly structure. The base diameter of such a structure can exceed 4 meters when it gets taller than approximately 80 meters.

Tower structures are subjected to static and dynamic forces, primarily vertical forces, such as the self-weight of the tower, turbine, and blades, and to lateral forces, such as wind and seismic forces. Generally, however, the lateral forces drive the design of the wind towers. The lateral forces produce bending moments and sway the tower structure. As the tower gets taller and the turbine gets larger and heavier, the magnitude of the bending moments and sway increase considerably.

As today's free-standing tapered-tube tower structure becomes excessively large, it becomes prohibitively expensive, hindering the competitiveness of wind power as an alternative source of energy, thereby rendering such a structural system less and less viable. To prevent the costs of wind tower installations from spiraling out of control, there is a pressing need to reverse the limitations of the present tower system.

OBJECTS OF THE INVENTION

It is an object of the present invention to provide a simple, structurally potent and aesthetic wind turbine tower.

It is also an object to provide a wind turbine tower which is cost effective to manufacture, transport, and install.

It is also an object to provide a wind turbine tower which can reach heights and accommodate powerful winds at high altitudes.

It is also an object to provide a wind turbine tower which can be used both on land and offshore

SUMMARY OF THE INVENTION

The above features and objectives are achieved by utilizing a reduced profile wind turbine tower (RPWTT) structure of the same footprint as a present massive tapered-tube tower, but substituting instead a slimmer uniform cylindrical spinal core surrounded by a number of axially loaded tubular arms interacting with the tower core via shear wings. The arms are laterally braced by the spinal core utilizing bracing rings. Global stability of the tower is achieved with the interconnected spinal core, shear wings, and tubular arms acting together.

A number of different embodiments are described based on the number of tubular arms used, types of bracing rings, open or closed shear wings or brackets, and fanned-out or straight tubular arms.

Other embodiments relate to the substitution of cables for the tubular arms. The cables are post-tensioned so that they can resist both tension and compression. Post-tensioning is a well-known technique commonly used to strengthen concrete slabs and other structural systems and elements in the construction of bridges, parking garages, and buildings.

Terrestrial RPWTT on foundations, as well as offshore RPWTT solutions on floating platforms, are so described.

The reduced profile wind turbine tower design of the present invention fundamentally changes the tower's structural behavior and opens new opportunities for taller, slimmer, more cost-effective wind towers that are significantly easier and faster to fabricate, transport, and install. The reduced profile wind turbine tower of the present invention has unmatched versatility and design flexibility, making it adaptable to many land-based and offshore applications. It permits efficient and economical super tall wind towers capable of harnessing more powerful winds at higher altitudes. The reduced profile wind turbine tower design permits optimization of the entire wind power system to include the tower structure and foundations with the power generating system, thereby unlocking previously untapped potential for reducing total expenditures and lowering the unit cost of energy.

Significantly, the reduced profile wind turbine tower boosts the hub height of today's typical wind tower without exceeding the current transportation limits. The new tower is virtually maintenance-free. The reduced profile wind turbine tower is slimmer, lighter, and non-tapered. Handling the reduced profile wind turbine tower sections is considerably easier and can be accomplished in less time. Unlike conventional towers, the new tower stiffness can be increased as needed at relatively minimal cost to improve the tower performance and its structural response to meet design needs. The reduced profile wind turbine tower can support a climbing tower crane to erect the next tower level, as well as facilitate the installation of the turbine and blades, thereby circumventing the need for a mammoth and costly land-staged crane. Furthermore, it addresses the tower connections, the critical link in any structure. Known proposed tall towers add numerous connections, thereby increasing many such critical links. With the reduced profile wind turbine tower, the number of connections is minimized and field splicing is simplified.

Designing and building much taller towers than today's 80 m high wind towers is possible so long as they comply with the laws of physics that necessitate a more robust structural system. At the present time, all known proposed tall towers translate "robust" structure to mean "larger size" structure. "Robust", however, need not mean "larger size". The reduced profile wind turbine tower achieves a more "robust" structure by shrinking the tubular system of today's tower while boosting the tower's stiffness and load resisting capacity by other, more efficient, structural means. In doing so, the reduced profile wind turbine tower reverses the limitations of today's tower and completely transforms the latter's massive structural system.

BRIEF DESCRIPTION OF THE DRAWINGS

The present invention can best be understood in conjunction with the accompanying drawings, in which.

LIST OF REFERENCE NUMERALS

Figure 1:
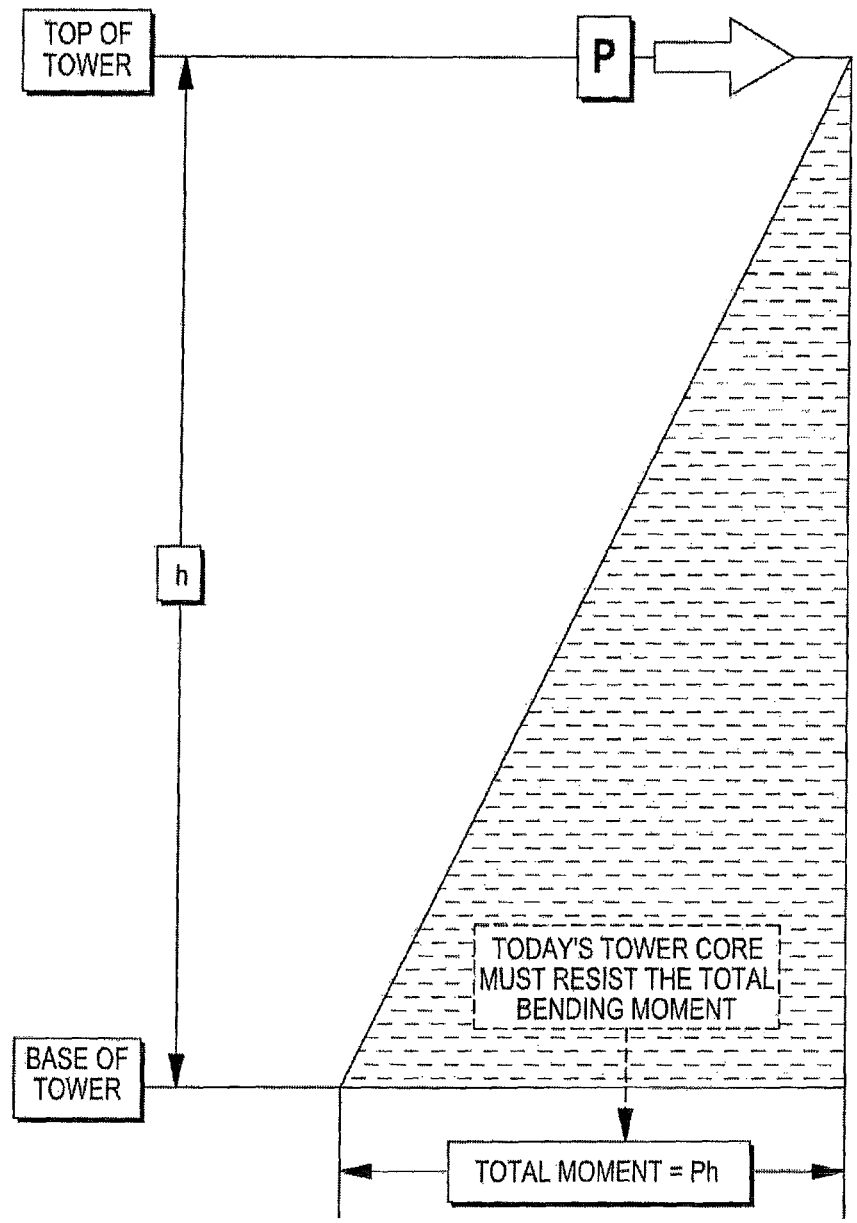
FIG. 1 is a bending moment diagram for a prior art free-standing tower core subjected to lateral force P.

5 prior art tapered-tube tower.
10 reduced profile wind turbine tower (RPWTT)
12 uniform spinal core
14 tubular arms
16 shear wings
17 disc-shaped bracing rings
18 circular flange plates
20 foundation for wind tower
22 wind tower turbine nacelle
24 turbine blade
26 cone-shaped bracing rings
28 openings in the shear wings with pairs of circular flange plates 18 at the edge of each opening.
30 open areas
32 rigid brackets with pairs of circular flange plates 18
34 fanned-out tubular arms 34 engaged at their bottom with foundation 20 or pontoon 52
36 optional horizontal tubes.
40 post-tensioned cables
42 foundation
44 rock anchors which go through the foundation 42 or outside foundation 46
46 foundation
48 fanning out of post tensioned cables 40
50 tubular arms or post-tensioned cables with wider distance from uniform spinal core 12 beyond a typical prior art tower
52 submerged pontoon
54 tie-down cables for submerged pontoon
56 high water level
58 low water level
60 sea bed
62 anchorage
70 top circular flange plate
72 bottom circular flange plate
76 top circular flange plate
78 shop-welded stiffeners
80 cables bearing plate
82 opening in flange plates
84 bottom circular flange plate
86 cable assembly
90 prior art wind turbine tower
91 proposed optional fanned out base section for tower 90
P lateral force
KL effective buckling length

DETAILED DESCRIPTION OF THE DRAWINGS

FIG. 1 shows the bending moments in a free-standing tower of a uniform diameter subjected to a lateral force P. The bending moments are the same for a tapered-tube tower. The bending moment increases as the tower gets taller, even under a constant force, and with it, the sway of the tower. The bending moments increase linearly with height, while the sway increases even more rapidly at the height to the power of three. Since today's tower core must resist the total bending moment and control the tower sway all on its own, the taller the tower the larger its size must become, necessitating a larger diameter and a thicker tube. Also, as the tower diameter increases, so must its shell thickness to prevent local buckling. As a result, today's tower structure becomes considerably more costly and significantly more difficult to fabricate, transport, and install. Transporting an oversized tower is subject to special transportation permits and in complex terrain or where physical infrastructure limitations exist, it is not possible to transport the tower on land at all.

Figure 2:
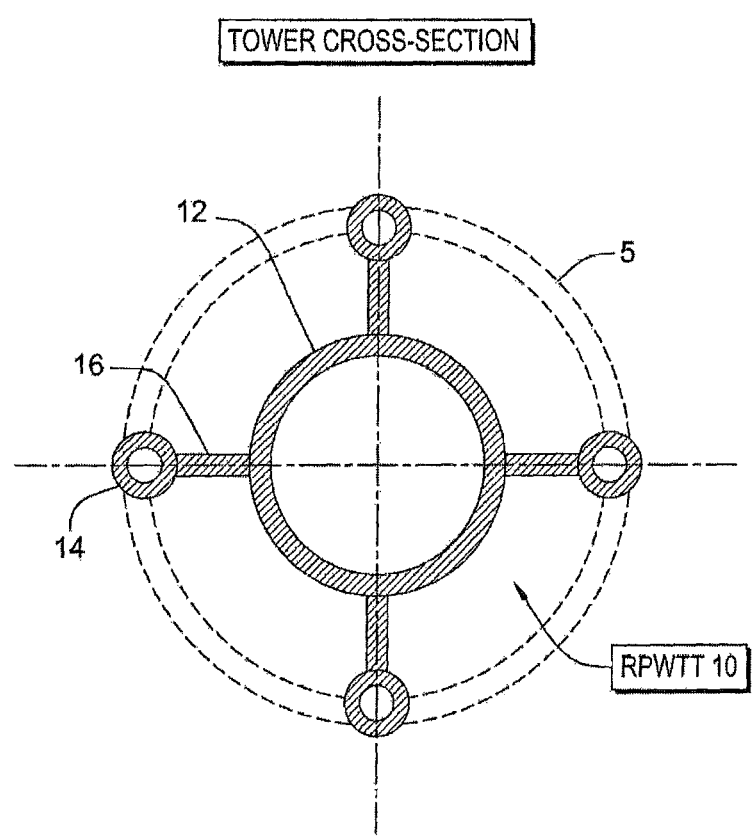
FIG. 2 is a cross-section view illustrating the basic tower transformation utilizing a square arrangement of tubular arms. The prior art tower cross-section 5 is shown in dashed lines for comparison. The new reduced profile wind turbine tower RPWTT 10 of the present invention is shown with uniform spinal core 12, shear wings 16 and tubular arms 14, which are shown in solid lines.
Figure 3:
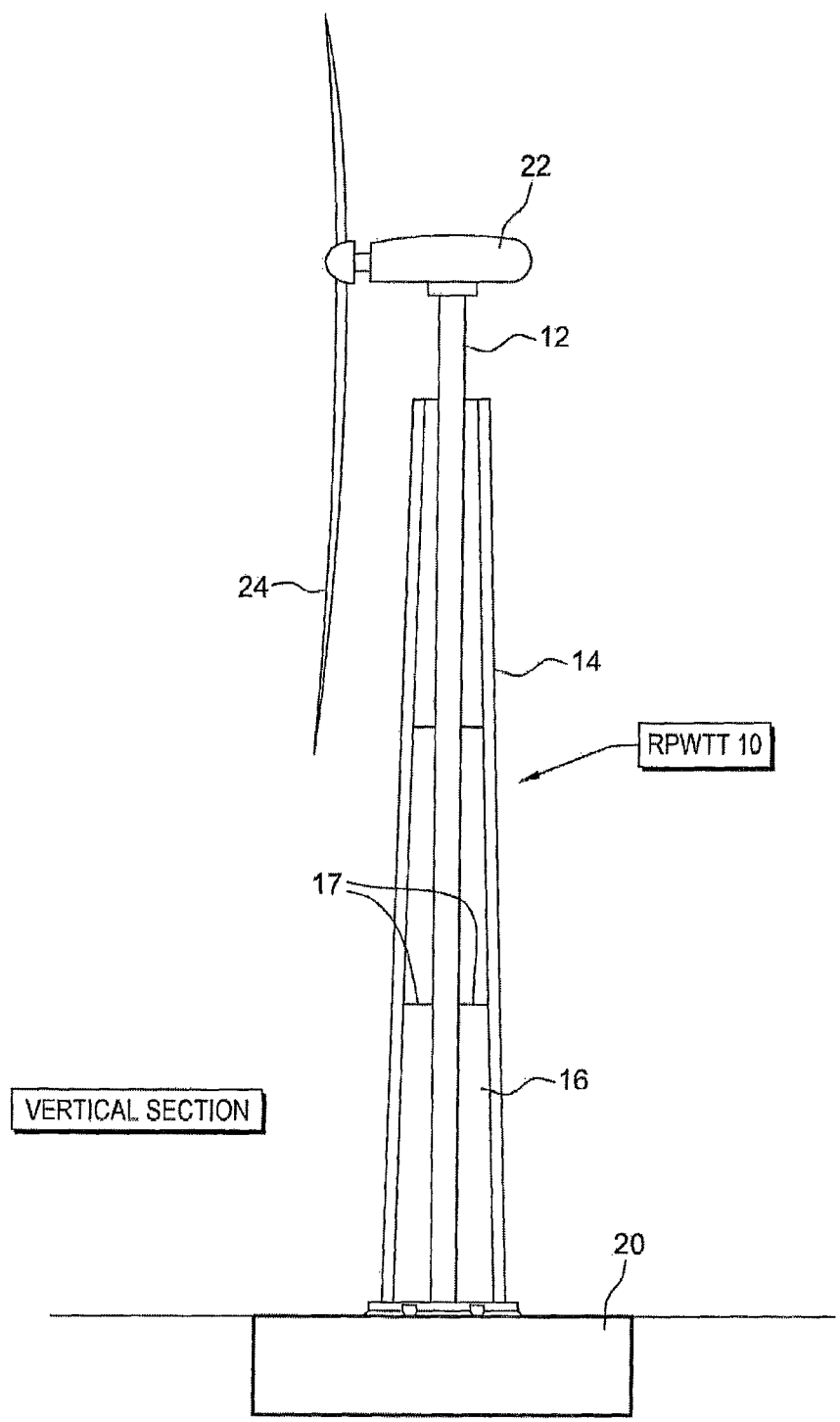
FIG. 3 is a vertical section of a reduced profile wind turbine tower RPWTT 10 of the present invention showing a uniform spinal core 12, tubular arms 14, continuous shear wings 16 and disc-shaped bracing rings 17. A wind turbine nacelle 22 with blade 24 and foundation 20 are also shown.

The basic reduced profile wind turbine tower structure RPWTT 10 supporting a turbine 22 with blades 24 (as shown in FIGS. 2 and 3) above a foundation 20 uses the same footprint as the present tapered-tube tower 5. But instead of today's massive structure 5, the reduced profile wind turbine tower of the present invention RPWTT 10 utilizes a slim spine with strong arms (as shown in FIGS. 2 and 3). It employs a smaller, lighter, and uniform cylindrical spinal core 12 that can carry all needed utility lines and provide protected access to the nacelle at the top of the tower. The reduced profile wind turbine tower core 12 carries primarily gravity loads and resists shear and torsion. It provides the needed structural stability during construction and enhances the overall stability of the tower at each subsequent stage. As each level is installed, the tower gains strength and stability. With each completed level, a sturdy, stand-alone structure is created that can withstand forces and moments all on its own.

With a uniform, non-tapered, cylindrical spinal core 12, the splicing of the tower sections can employ full direct bearing of the upper tower section on its lower section and utilize shear splicing, eliminating the need for the less efficient flange splices which require full penetration welds and subject the bolts and the full penetration welds to tension. This can be accomplished by fitting a cylindrical piece shop-bolted to the core's lower section and field-bolted to its next upper section.

Figure 4:
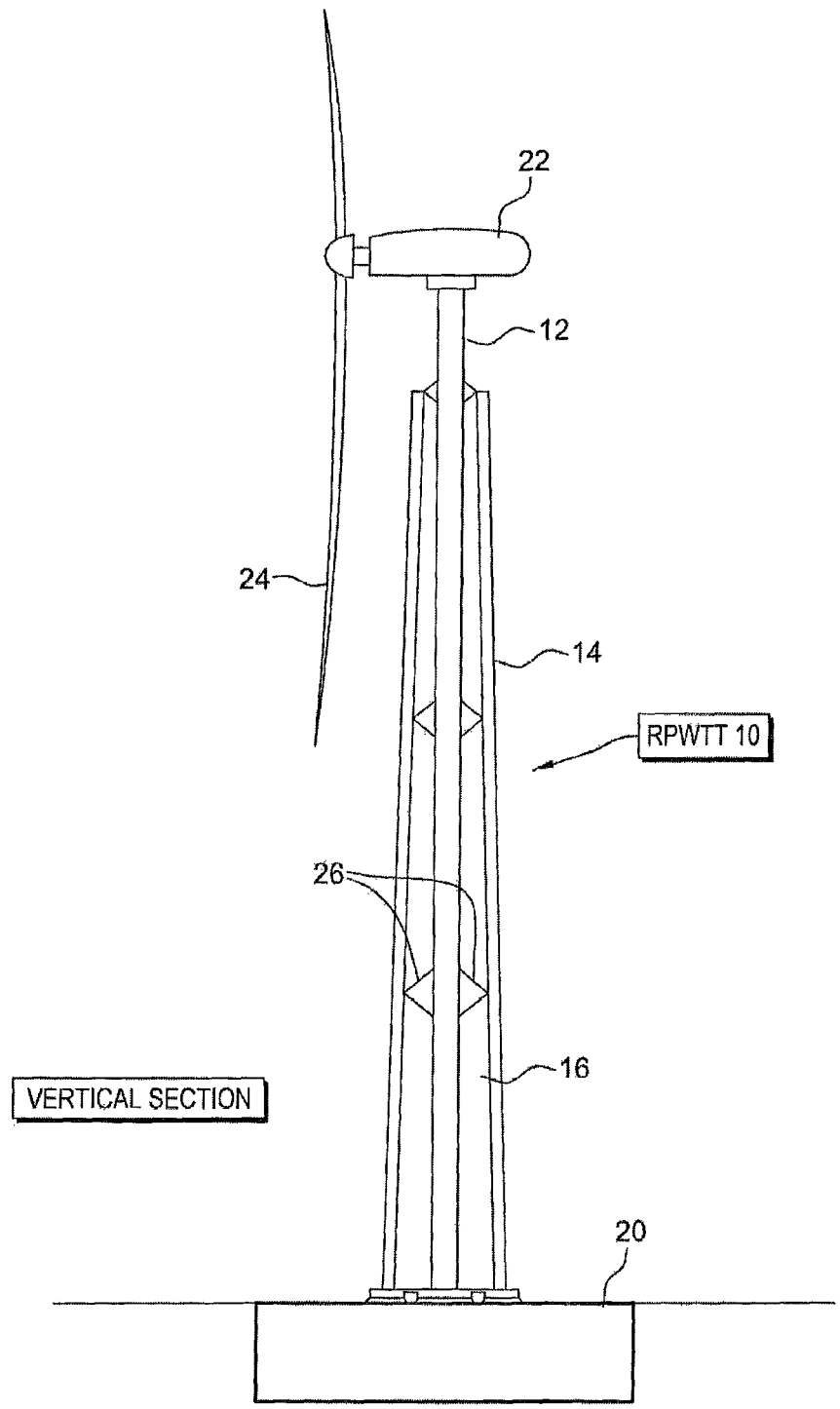
FIG. 4 is a vertical section of a reduced profile wind turbine tower RPWTT 10 of the present invention showing the use of cone-shaped bracing rings 26.

In reduced profile wind turbine tower RPWTT 10, only a small part of the external bending moments is resisted by the slim cylindrical spinal core 12. The larger part of the bending moments is resisted by the highly efficient, axially loaded tubular arms 14 interacting with the tower core 12 via continuous shear wings 16. Unlike today's tapered-tube tower 5, the reduced profile wind turbine tower tubular arms 14 are uniformly stressed. They can be set vertically or slightly sloped. The arms 14 are laterally braced by the spinal core 12 utilizing disc-shaped bracing rings 17 (as shown in FIG. 3) or more aerodynamic cone-shaped bracing rings 26 (as shown in FIG. 4). The latter bracing is also the solution where nesting is a concern. In so doing, the presence of slender components within the transformed tower structure is avoided. Global stability is provided by the transformed structural system with the spinal core 12, the shear wings 16, and the tubular arms 14 acting in unison. The foundation design depends primarily on the specific reduced profile wind turbine tower system used, the loads imposed on the tower, and the local geotechnical conditions. Connections between the reduced profile wind turbine tower components are simple and can be detailed to be shop-welded and field-bolted to facilitate fabrication and erection most efficiently.

Figure 5:
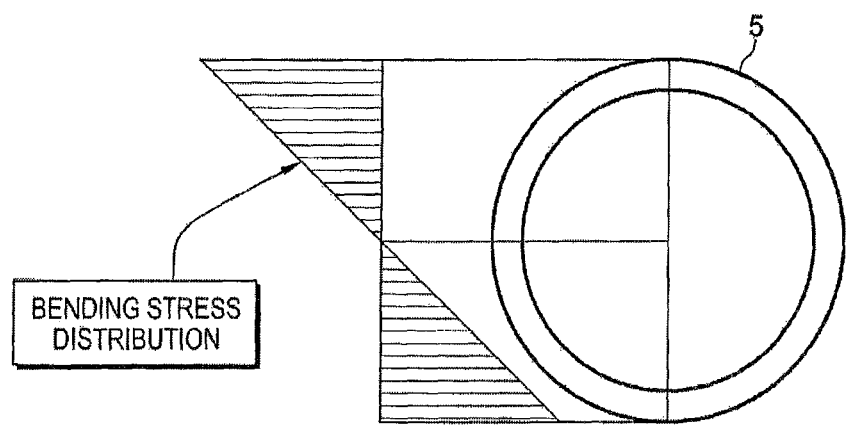
FIG. 5 is a bending stress distribution of a prior art cylindrical or tapered-tube tower 5.

One of the inherent drawbacks of today's prior art tower 5 results from its structural system resisting the overturning moments through bending only. A cylindrical or tapered-tube tower is very efficient in resisting buckling and torsion, but not very effective in resisting bending or limiting sway, two key drivers in the design of a wind tower. In a cylindrical or tapered-tube tower, bending under working conditions produces a gradient of internal stresses where only the extreme fiber in a tower's cross-section is stressed to the full strength of the material, leaving most of the tower's material under-stressed (as shown in FIG. 5). Consequently, under working conditions, most of today's tower material, when subjected to bending, is underutilized. The taller and larger today's tower 5 becomes, the greater its material underutilization, and the greater the inefficiency in its structural system.

The reduced profile wind turbine tower RPWTT 10 of the present invention resolves this limitation by significantly reducing the bending moments on the cylindrical core 12 and employing it primarily in resisting gravity loads, shear, torsion, and buckling, where it is most suited.

Figure 6:
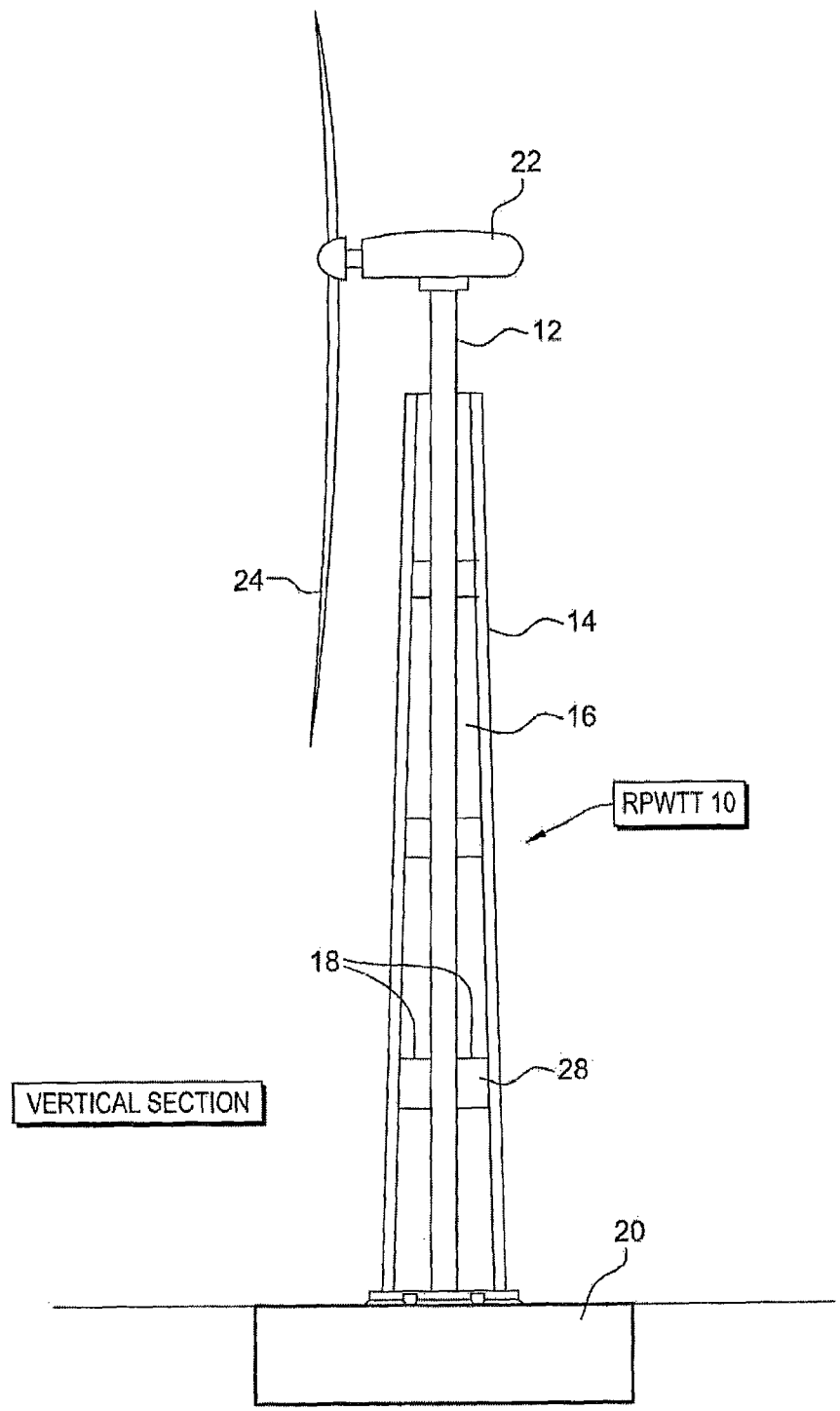
FIG. 6 is a vertical section of a reduced profile wind turbine tower RPWTT 10 of the present invention showing openings 28 in the shear wings with pairs of circular flange plates-18 at the edge of each opening.
Figure 7:
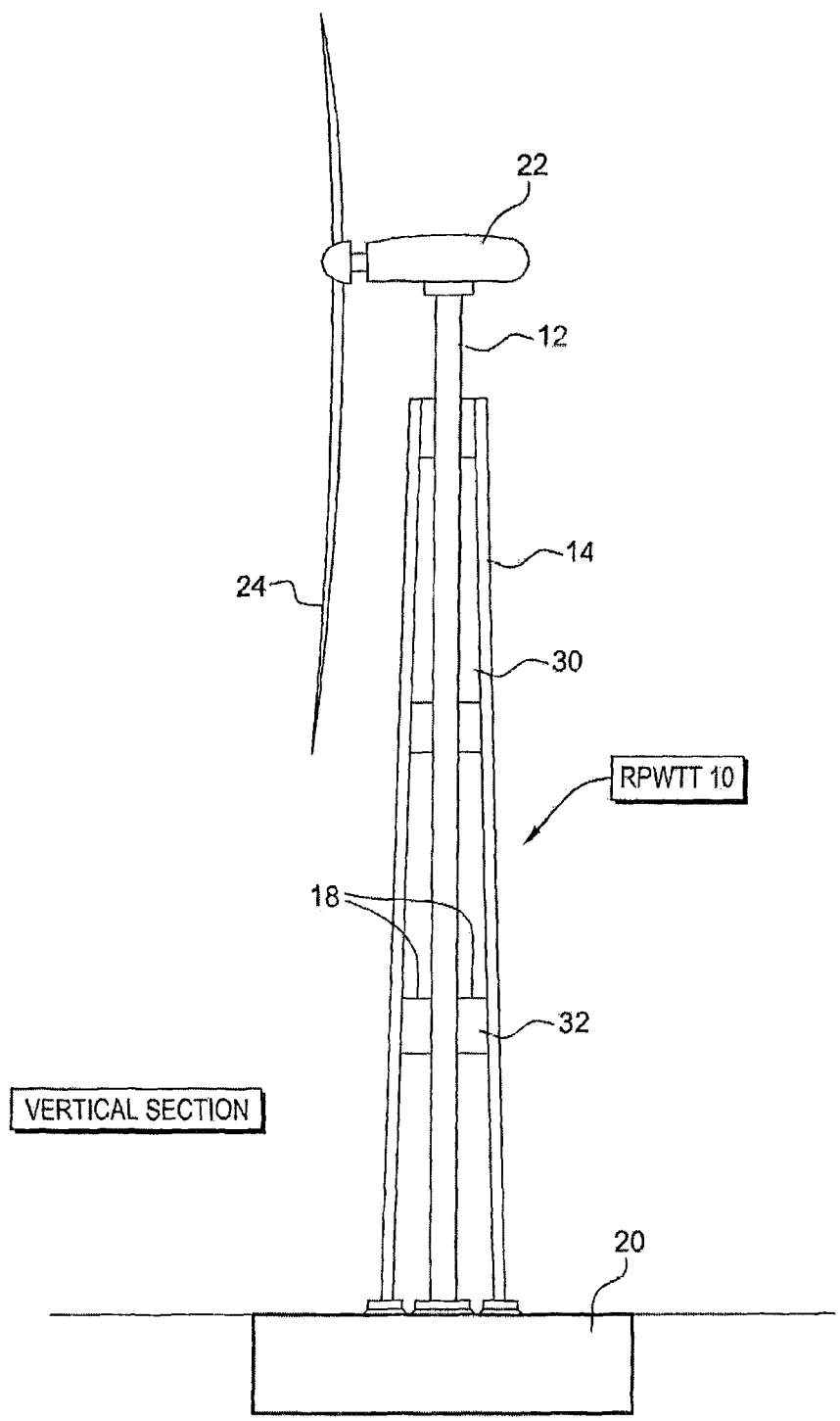
FIG. 7 is a vertical section of a reduced profile wind turbine tower RPWTT 10 of the present invention showing assemblies of rigid brackets 32 with pairs of circular flange plates 18 and open areas 30 between assemblies.
Figure 7A:
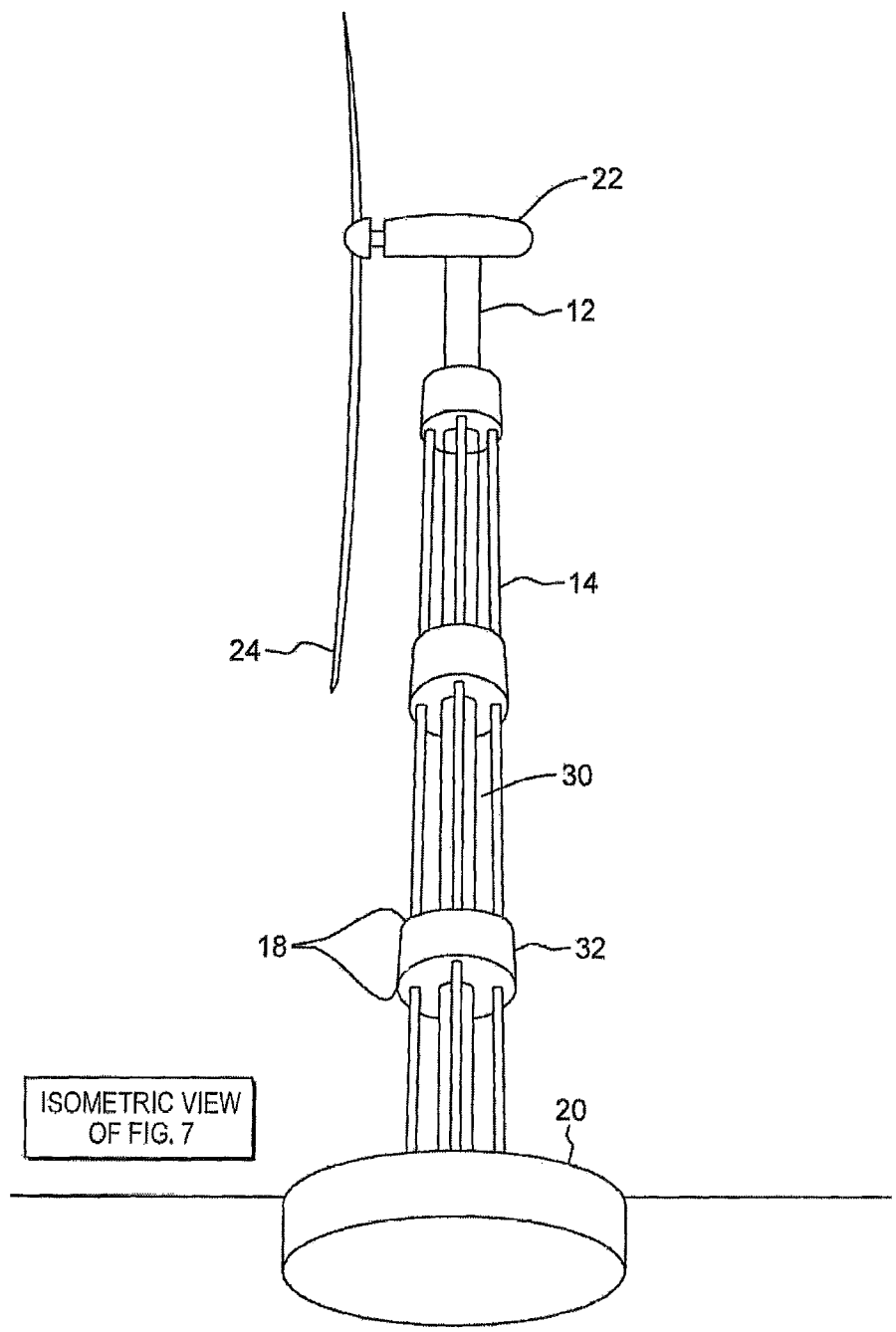
FIG. 7A is an isometric view of the RPWTT of FIG. 7, shown with the rigid brackets 32 and circular flange plates 18 being enclosed.
Figure 8:
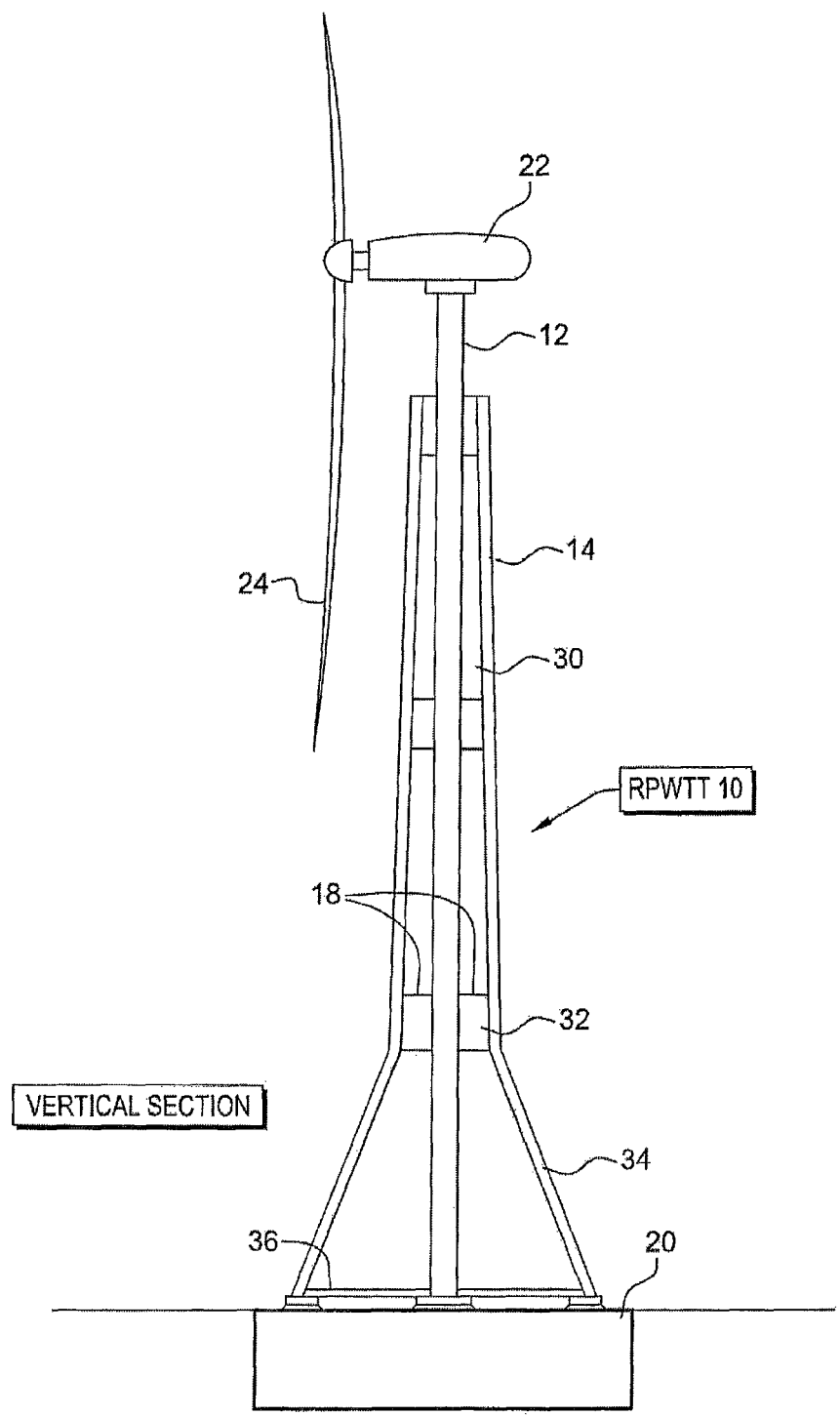
FIG. 8 is a vertical section of a reduced profile wind turbine tower RPWTT 10 of the present invention using fanned-out tubular arms 34 engaged with foundation 20 at the bottom with optional horizontal tubes 36.

Furthermore, the shear wings 16 can be designed with openings 28 to further simplify fabrication and erection and cut costs (as shown in FIG. 6). At the limit, most of the wing area may be left open, reducing the shear wings 16 to rigid brackets 32 (or rigid cantilevers) placed at distinct levels (as shown in FIG. 7). The brackets 32 are made of vertical shear plates and horizontal circular flange plates 18. The bracket assembly will be enclosed, as shown in FIG. 7A, to improve aerodynamics and prevent nesting. To keep the inside of the tower core 12 mostly open, a stronger transition core section at the brackets 32 may be required. This can be accomplished locally by utilizing a somewhat thicker core, while keeping the outside diameter of core 12 unchanged. An added benefit of the rigid brackets 32 with their circular flange plates 18 (as shown in FIG. 7) is that they provide sturdy platforms that can be used to erect the next tower level as well as facilitate the installation of the turbine 22 and blades 24. In other words, in addition to their structural function in the tower RPWTT 10, they are capable of serving as a stage to support a climbing tower crane avoiding the need for a larger and much costlier land-staged crane.

Where project conditions permit, the tubular arms 14 can be fanned-out at 34 to reduce the anchoring forces into the foundation and, thereby, the anchorages themselves (as shown in FIG. 8). At the lower end of the tubular arms 14, the horizontal force component may be transferred to the foundation or, optionally, this force may be transferred back to the tower core via a horizontal tube 36 (as shown in FIG. 8). In this way, the present invention "cancels-out" the horizontal force component created in the tower core 12 by the fanned-out tubular arms 34 at their upper end, thereby eliminating the need to account for the horizontal force component in the connection between the core and the foundation, as well as that between the tubular arms 34 and the foundation 20.

Figure 9:
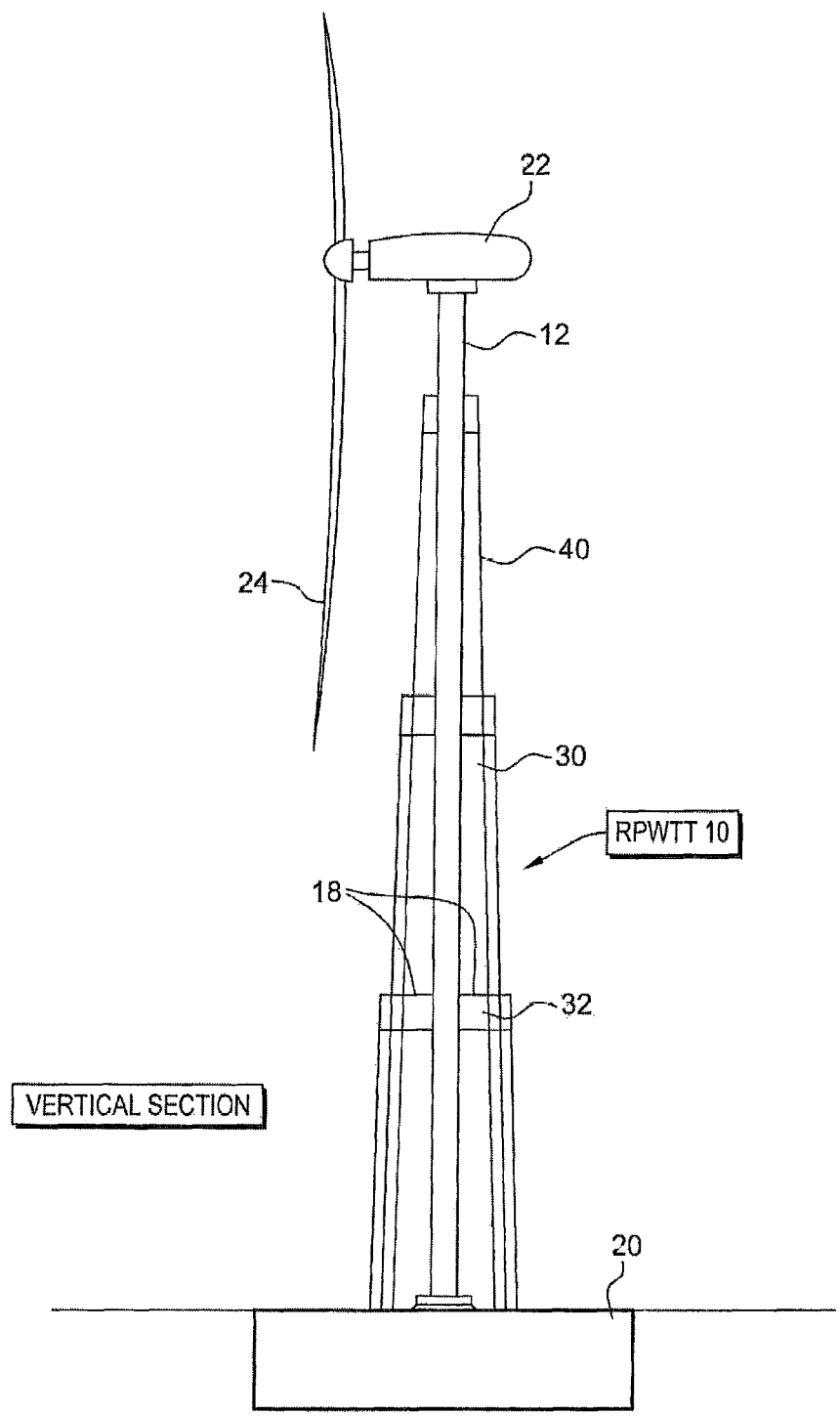
FIG. 9 is a vertical section of a reduced profile wind turbine tower RPWTT 10 of the present invention employing post-tensioned cables 40 as a substitute for tubular arms 14; this embodiment also uses assemblies of rigid brackets 32 with pairs of circular flange plates 18 and open areas 30 between assemblies.

In another transformation of the tower design, post-tensioned cables 40 can be used to replace the tubular arms 14 (as shown in FIG. 9). The cables 40 are post-tensioned to ensure that they remain with the proper tension under all design loading conditions. Post-tensioning increases the compression force in the core 12. On the other hand, in utilizing cables, field connections are reduced and the fabrication, transportation, and erection streamlined. In fact, transportation becomes a non-issue as shipping cables is a fairly standard trucking job. Cables 40 can be shaped to follow any contour to meet the design needs and choice. An added benefit of the post-tensioning is that, in effect, it load-tests the tower system during construction. Moreover, the cables 40 can be anchored directly into the foundation 20, further simplifying construction operations. The cables 40 are designed to be restressable and replaceable. The reduced profile wind turbine tower cables 40 can be braced at each bracket level with rigid brackets 32, making their unbraced length much shorter than the typical cables in use in bridges.

The tower core 12 can take various forms and it can be constructed of different materials such as steel, precast concrete, cast-in-place reinforced concrete, or post-tensioned concrete. Post-tensioning the reduced profile wind turbine tower cables 40 introduces compression into the tower core 12 which reduces the moment-induced tension in the core structure, thereby allowing for simpler and smaller splice connections. The post-tensioning of the cables 40 has an added benefit in concrete structures as it reduces the tension in the tower core 12, thereby requiring less reinforcement and/or lesser internal post-tensioning. In addition, for efficiency, a slip form can be utilized to cast-in-place the tower's uniform spinal core 12.

If necessary, the cables 40 can be protected locally at grade level by placing each cable inside a protective casing approximately 20 to 25 feet high from ground level. Depending on the security type desired, the space between the casing and the cable can be grouted or a blast protective jacket can be installed. The complete assembly will then be sealed. Such a system was pioneered by the inventor in 1995, while a principal at another firm, and subsequently successfully implemented at several suspension bridges including the George Washington Bridge, the Verrazano-Narrows Bridge, and the Whitestone Bridge.

Figure 10:
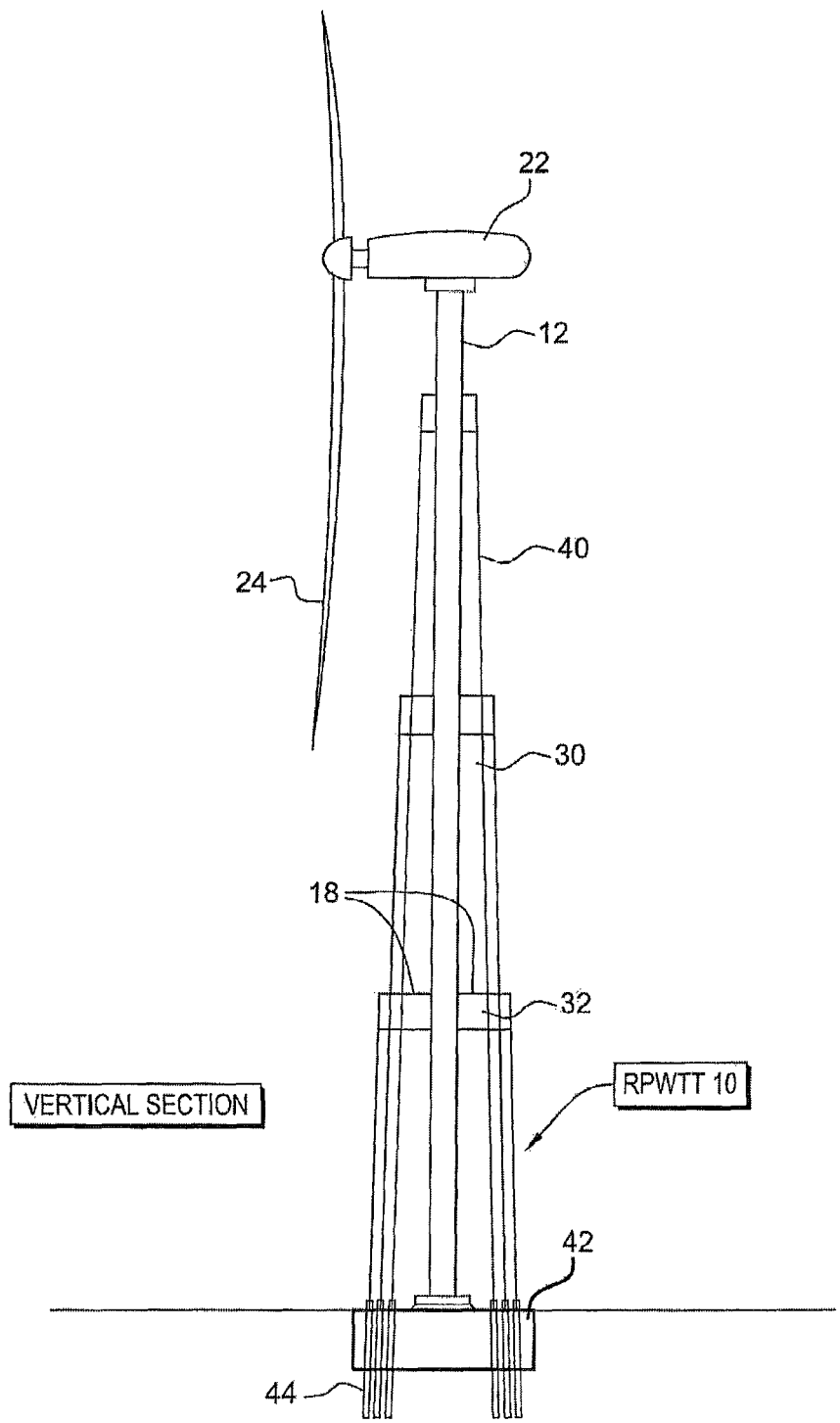
FIG. 10 is a vertical section of a reduced profile wind turbine tower RPWTT 10 of the present invention employing post-tensioned cables 40 connecting at the bottom to rock anchors 44 which go through the foundation 42.
Figure 11:
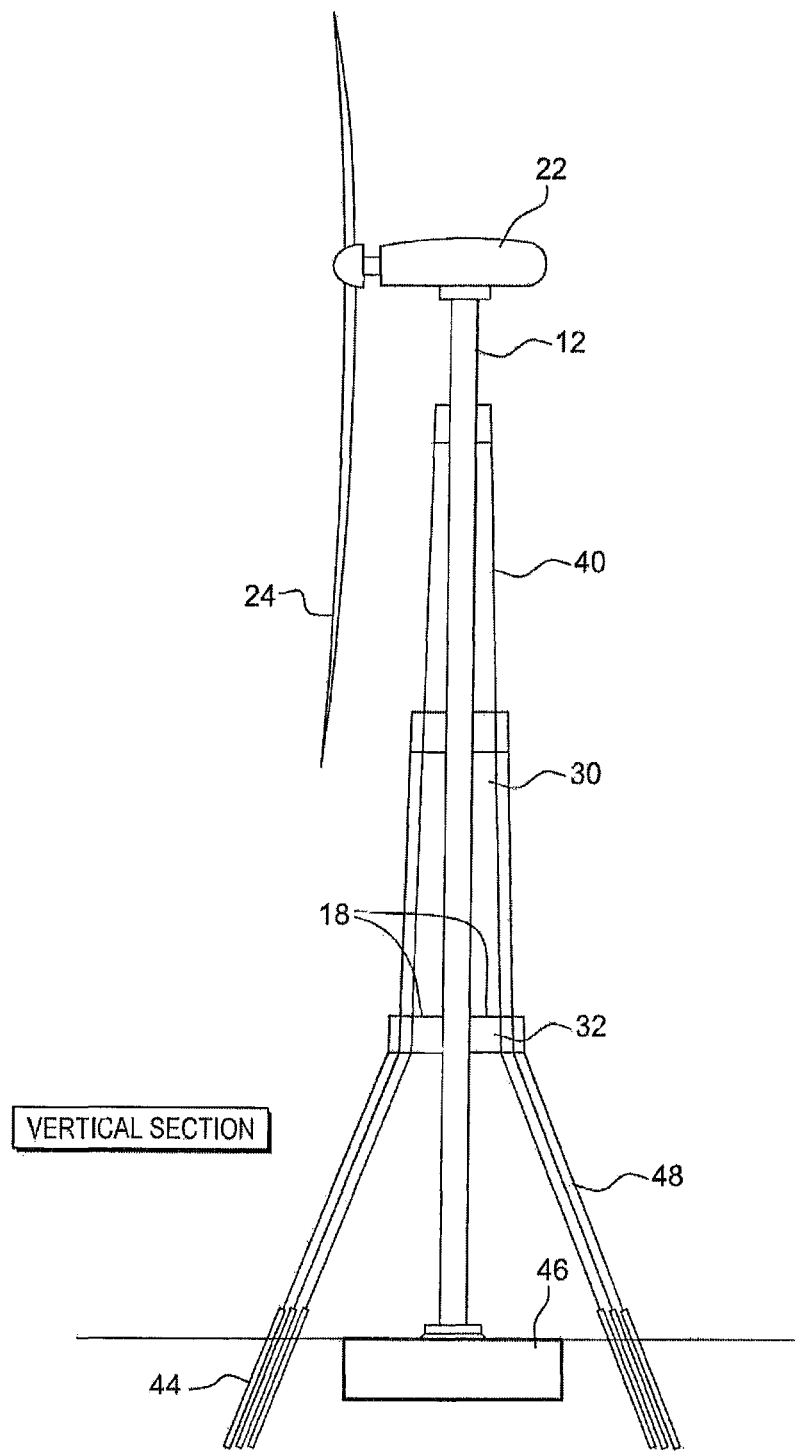
FIG. 11 is a vertical section of a reduced profile wind turbine tower RPWTT 10 of the present invention employing post-tensioned cables 40 which are preferably fanned out 48 at bottom around the foundation 46 and terminate in rock anchors 44.

In competent rock substrate, the cables 40 can be anchored into the rock directly by rock anchors 44, reducing the size of the foundation significantly (as shown in FIG. 10). Furthermore, similar to a reduced profile wind turbine tower RPWTT 10 with tubular arms 14 (as in FIGS. 2-4 and 6-8), a reduced profile wind turbine tower RPWTT 10 with post-tensioned cables 40 can have the cables 40 optionally fanned-out at lower cable portions 48 to substantially reduce the anchoring forces and the size of the anchorages and foundation (as shown in FIG. 11).

Figure 12:
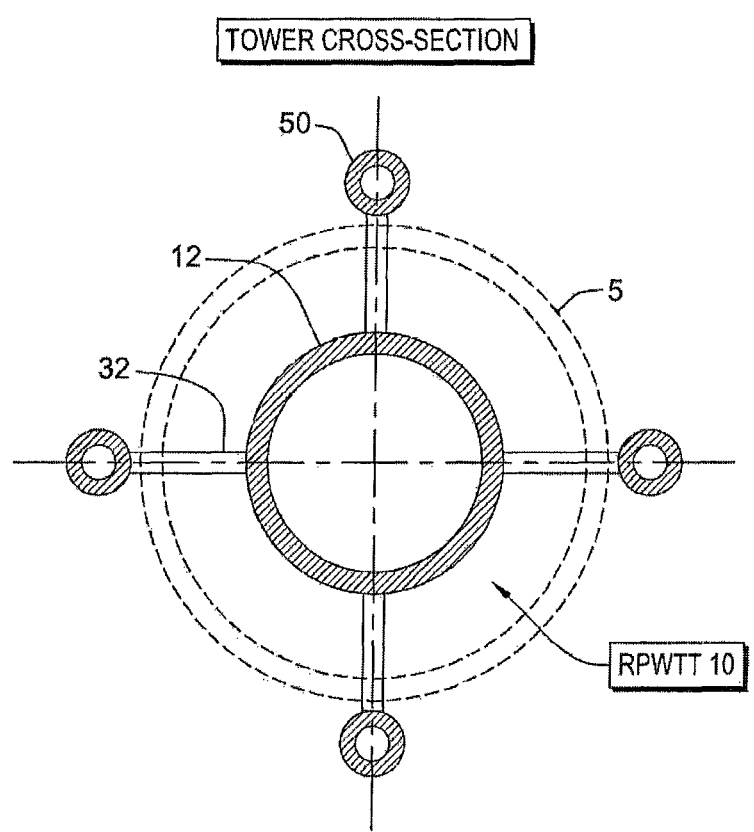
FIG. 12 is a tower cross-section showing a reduced profile wind turbine tower RPWTT 10 of the present invention with tubular arms or post-tensioned cables 50 with wider distance from uniform spinal core 12 beyond a typical prior art tower 5; tubular arms or cables 50 are shown in an extended-square arrangement.

Unlike today's tower 5, where increasing its capacity to resist external bending moments and to control its sway necessitates a tower of a larger diameter and/or a thicker shell at added costs, the reduced profile wind turbine tower RPWTT 10 offers increased stiffness and capacity at lower costs by widening the distance between the tubular arms or cables 50 and enhancing the tower efficiency (as shown in FIG. 12). In so doing, the axial forces in the tubular arms or cables 50 and the shear forces in the rigid brackets 32 are reduced, while the bending moment resisted by the brackets 32 remains practically the same. This makes the modular reduced profile wind turbine tower designs possible for a range of reduced profile wind turbine tower sizes, as the user can keep a constant core size and only widen the distance between the tower's tubular arms or cables 50, subject to constraints imposed by the wind turbine 22 and blades 24.

Figure 13:
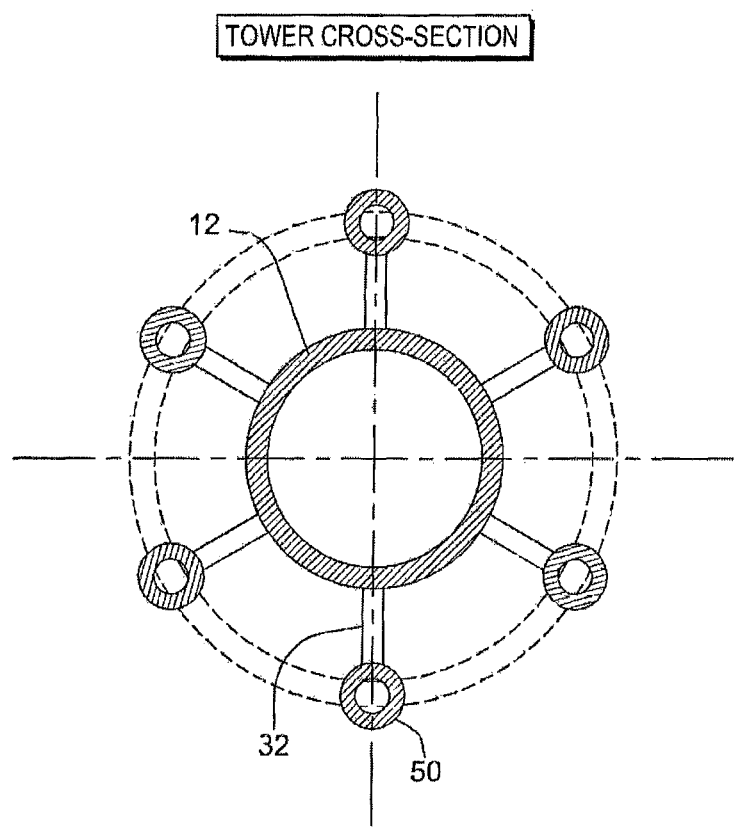
FIG. 13 is a tower cross-section of a reduced profile wind turbine tower RPWTT 10 of the present invention utilizing a plurality of hexagon arrangement of six tubular arms or post-tensioned cables 50 attached by brackets 32 to spinal core 12.

For tall towers, employing other arrangements of the tubular arms or cables 50 may be favored. FIG. 13, for example, shows a hexagon plan-arrangement of six tubular arms or cables 50. Such spread-out arrangements would be preferred in order to reduce the forces in each arm or cable 50, thereby reducing the size of the arms or cables 50, the size of the brackets 32, and the size of the transition core section at the brackets 32. The number of levels of rigid brackets 32 may also be increased to further reduce the forces in the tubular arms or cables 50 and the bending moments in the spinal core 12, in order to reach a well-balanced solution.

The reduced profile wind turbine tower design of the present invention produces two interdependent subsystems: one is the uniform tower core 12 (the core subsystem) and the other comprises the tubular arms or cables 50 and their respective rigid brackets 32 with pairs of circular flange plates 18 (the brackets subsystem). These two subsystems jointly resist the external forces and moments, limit the sway of the tower RPWTT 10, and govern the overall stability of the tower 10. This presents the designer with the choice of determining how these two subsystems should share in the overall design. Generally, the relative stiffness of the two subsystems drives the overall performance of the tower RPWTT 10. A relatively soft tower core 12 would yield control to a stiff bracket subsystem, while a relatively soft bracket subsystem would yield control to a rigid tower core 12.

The interaction between the two subsystems presents us with a tool that allows the designer to modify the tower structural behavior to meet project-specific needs. Rather than a single free-standing tapered tube tower system 5, the user now has unlimited possibilities to mold and shape the tower RPWTT 10 structural system to his or her advantage. The reduced profile wind turbine tower innovation transforms the design entirely from one in which the designer merely has a reactive role, to one in which, to a large extent, the designer is in command. The user may explore related flexibilities in the design of the power generating system, for example, in finding ways to increase the tower moment arm without compromising the efficiency of the turbine 22 and blades 24. This can unlock a treasure-trove of new possibilities for optimizing the structural design and the design of the wind power generating system as a whole, thereby unlocking previously untapped potential for reducing total expenditures and lowering the unit cost of energy.

The reduced profile wind turbine tower RPWTT 10 of the present invention offers many design options from which the user may choose the most efficient alternative for a given set of conditions. The user may select a different relative stiffness for the core 12 and bracket subsystems, different bracket plan arrangements, and different bracket levels. For the first design iteration, the user assumes that the tower core 12 resists all shear forces and torsion, as well as the turbine and blade gravity loads, while the structure self-weight can be applied to each structural member individually. To reduce costs, the top section of the uniform core 12 is left to stand alone as a free-standing cantilever without the help of the bracket subsystem. This is possible since, in practice, the uniform spinal core 12 itself has a certain inherent capacity that is sufficient to resist the forces and moments on its own. In addition, the user assumes that the core 12 is subjected to complete fixity at its base and to rotational fixity, in a vertical plane, at each bracket level. The latter assumption is intended to minimize the core size by assigning the larger portion of bending moments to the more efficient moment-resisting bracket subsystem. This, in turn, translates to a softer core 12 and a stiffer bracket subsystem. In subsequent iterations, the user fine-tunes the design to produce the most effective and economical overall system.

Figure 14:
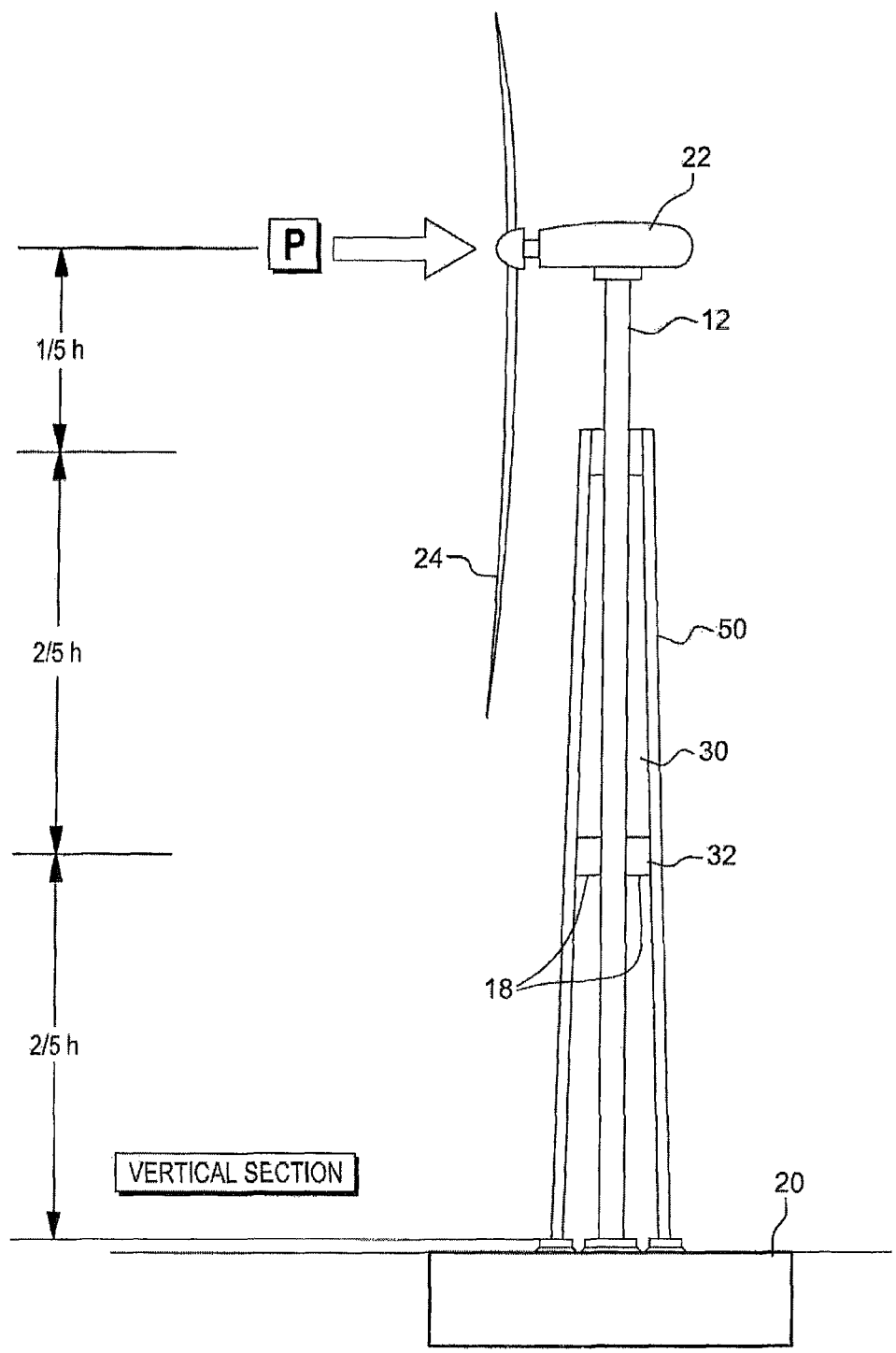
FIG. 14 is a vertical section of a reduced profile wind turbine tower RPWTT 10 of the present invention with tower height h. Rigid brackets 32 with pairs of circular flange plates 18 are at two heights, ⅔ h from the bottom and ⅘ h from the bottom. Tower spinal core 12 and tubular arms or post-tensioned cables 50 are subjected to lateral force P.
Figure 15:
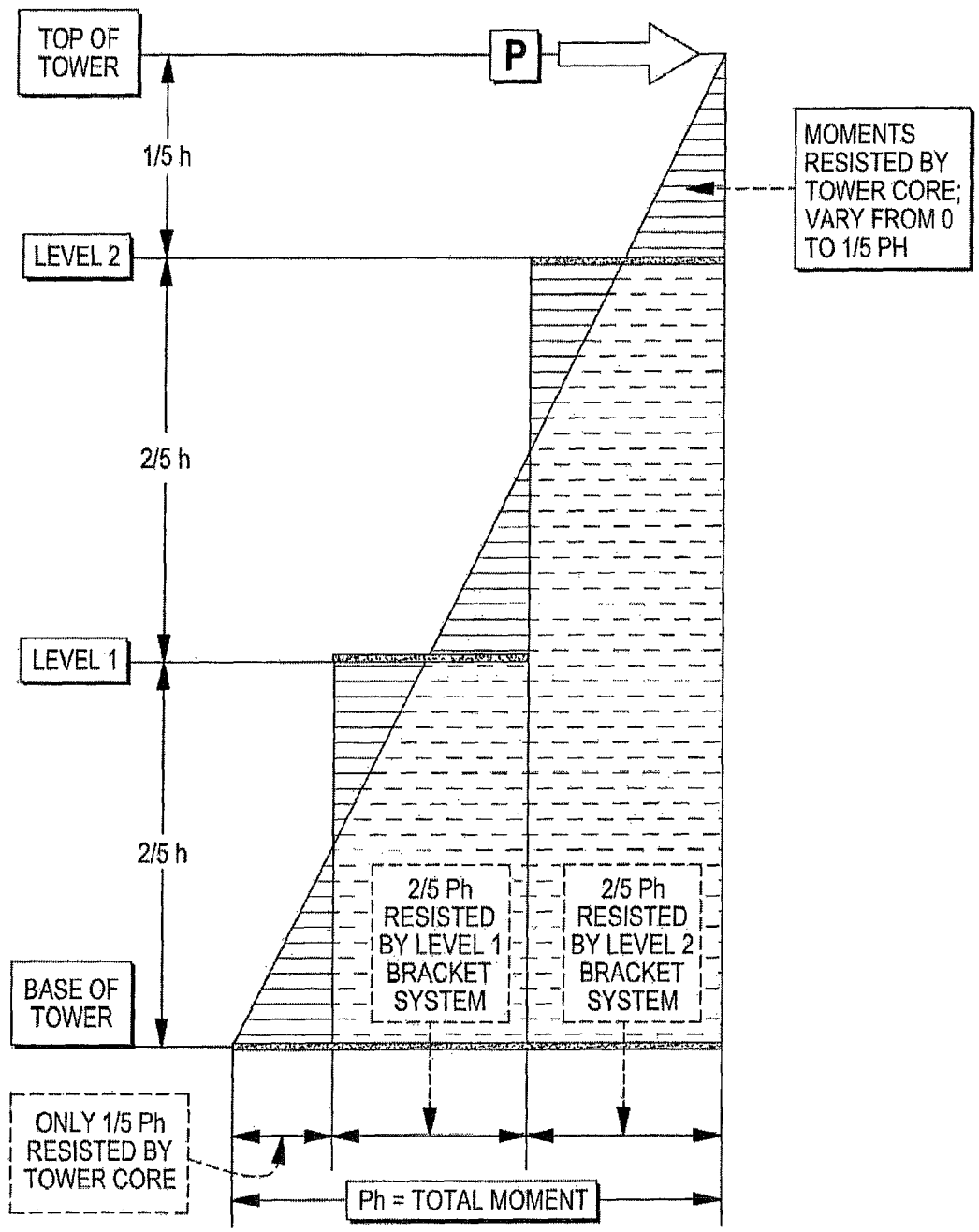
FIG. 15 is a bending moment diagram of the reduced profile wind turbine tower RPWTT 10 of the present invention configuration of FIG. 14, with rotational fixity at ⅔ h and ⅘ h from the bottom.

To demonstrate this approach, FIGS. 14 and 15 show a reduced profile wind turbine tower RPWTT 10 with a uniform core 12 and two bracket levels, one at ⅔ height from the bottom of the tower and another at ⅘ height from the bottom of the tower, where h is the tower overall height. The top ⅕ height of the core is left to stand alone as a free-standing cantilever. FIG. 15 shows the bending moment diagram for the core and the bracket subsystems under a lateral force P applied at the top of the tower. This simplified assumption of a single force P does not detract from the conclusions presented herein. In practice, instead of a single lateral force P, the user uses the actual lateral loads imposed on the tower RPWTT 10.

In this example, each bracket sub-system at each of the two levels resists 40% of the total bending moment (as shown in FIG. 15). The bending moment resisted by each bracket 32 is constant from the corresponding bracket level down to the base of the tower at foundation 20. Together, the brackets 32 at the two levels resist 80% of the total bending moment imposed on the tower RPWTT 10. The core 12 resists only ⅕ of the total bending moment, a mere 20%. This is five times smaller than the bending moment that would have been imposed on the core 12 had it been free-standing. In addition, it is noted that the bending moments in the core 12 are not continuously increasing as in a free-standing tower (as shown in FIG. 1), but rather are re-distributed more evenly along the core 12, justifying the design of a uniform, more cost-effective core structure.

For the bending moment diagram shown in FIG. 15, the sway at the top of the core 12 is reduced 25 fold to a mere 4% of the sway of a free-standing core under the same conditions. Such a dramatic reduction in the sway of the tower has significant beneficial consequences in reducing the P-$\Delta$ effect in the tower design. Furthermore, the deformed shape of the core 12 is fundamentally altered, dropping the theoretical effective buckling length (KL) 5 fold, from KL=2 h for a free-standing core to KL=(⅖) h in this case. Thus, the core in this case is able to resist significantly larger compression forces than a stand-alone core of the same size. This example visibly demonstrates the beneficial interaction between the two subsystems and illustrates the versatility and structural potency of the reduced profile wind turbine tower design.

As the user introduces more bracket 32 levels along the tower RPWTT 10, the core 12 bending moments and the tower sway can be reduced even further. This process, however, would not have to continue indefinitely even for tall towers, as a few bracket 32 levels would be sufficient to produce an optimal solution. In practice, the user locates the bracket 32 levels to coincide with the maximum transportable length of the tower core 12.

As noted earlier, in reduced profile wind turbine tower, the degree of fixity between the core 12 and the bracket subsystem is determined by the designer. An important variable in this relationship is the ratio between the stiffness of the tower core 12 to the stiffness of the bracket subsystem. The designer is presented with a trade-off between the size of the tower core 12, the size of the tubular arms or cables 50, the number of bracket levels, and the plan arrangement of the tubular arms or cables 50. The appropriate selection of these variables, to a large extent, depends upon the tower height, the forces imposed on the tower RPWTT 10, the distance in plan between the tubular arms or cables 50 (moment arm), and the local soil conditions. The reduced profile wind turbine tower RPWTT 10 affords the designer a powerful tool with which he or she can control, mold, and shape the tower design. Through proper calibration of the reduced profile wind turbine tower design, the user can produce an efficient and cost-effective project-specific tower structure RPWTT 10.

The cables 40 in a reduced profile wind turbine tower RPWTT 10 can be left exposed, as they are when used in bridges. Similarly, the tubular arms 14 can be left exposed. Left exposed, this offers the smallest projected surface area resisting the wind. However, if for non-structural reasons it is desired to enclose the entire tower RPWTT 10, the whole system can be easily tented utilizing lightweight reinforced fabric cladding, e.g. Teflon-coated woven fiberglass, attached to the cable system in a manner similar to tent-like structures, either by attaching the fabric to the tower main cables 40 or by introducing additional longitudinal cables to support the fabric enclosure independent of the main supporting structural cable system. The fabric is stretched taut over the cables to prevent slack and provide the needed fabric stability under load. Tenting need not extend from the top of the tower RPWTT 10 to its foundation 20 if complete enclosure is not needed. Rather, it may terminate at any desired level above ground. Each bracket 32 with its pair of circular flange plates 18 can serve as a natural termination point. Tents and other forms of cable-supported fabric structures are a known and tested technology that can be integrated very well into the reduced profile wind turbine tower design. Currently, fabric structures offer a life span of about 30 years.

The reduced profile wind turbine tower RPWTT 10 is a versatile and powerful pioneering system that capitalizes upon the possibilities and benefits offered by complete transformation of today's tower structure. The reduced profile wind turbine tower RPWTT 10 reverses today's tower 5 limitations and enhances the performance and efficiency of the new tower RPWTT 10 system. With a reduced profile wind turbine tower RPWTT 10, the sway of the tower RPWTT 10 is effectively controlled, and the bending moments resisted by the tower core 12 become considerably smaller and more evenly distributed along its height. The results unlock new possibilities for taller, slimmer, and more cost-effective wind towers RPWTT 10 that can help reduce the capital costs of wind power installations and aid in making wind power a more competitive form of energy.

The Offshore Solution: Floating

According to Navigant 2013, wind tower support, foundations, logistics and installation account for 47% of offshore installation capital cost, without construction financing.

The DOE reports:

Almost all offshore wind installations have used a monopole or concrete gravity base foundation in water less than 20 meters (65 feet) deep. Foundations for large offshore wind structures installed in deeper water, whether fixed to the sea floor or floating, are one of the key issues that will impact the feasibility of wind development at transitional depths. (U.S. Department of Energy Wind Energy Multiyear Program, Plan for 2007-2012). The design, versatility, and simplicity of the reduced profile wind turbine tower make it an effective and economical system in offshore applications, as well. The reduced profile wind turbine tower is seamlessly adaptable to a floating tower by integrating into its structural system the water's limitless power to uplift. Floating bridges and structures, such as pontoons, have been known since Biblical times. Nonetheless, while water can provide an economical floating foundation, it introduces new challenges in the form of hydrodynamic forces, bobbing, sway, twist, and seesaw movements which need to be controlled in wind tower applications. The proposed floating reduced profile wind turbine tower system responds to these challenges in a most effective way.

Figure 16:
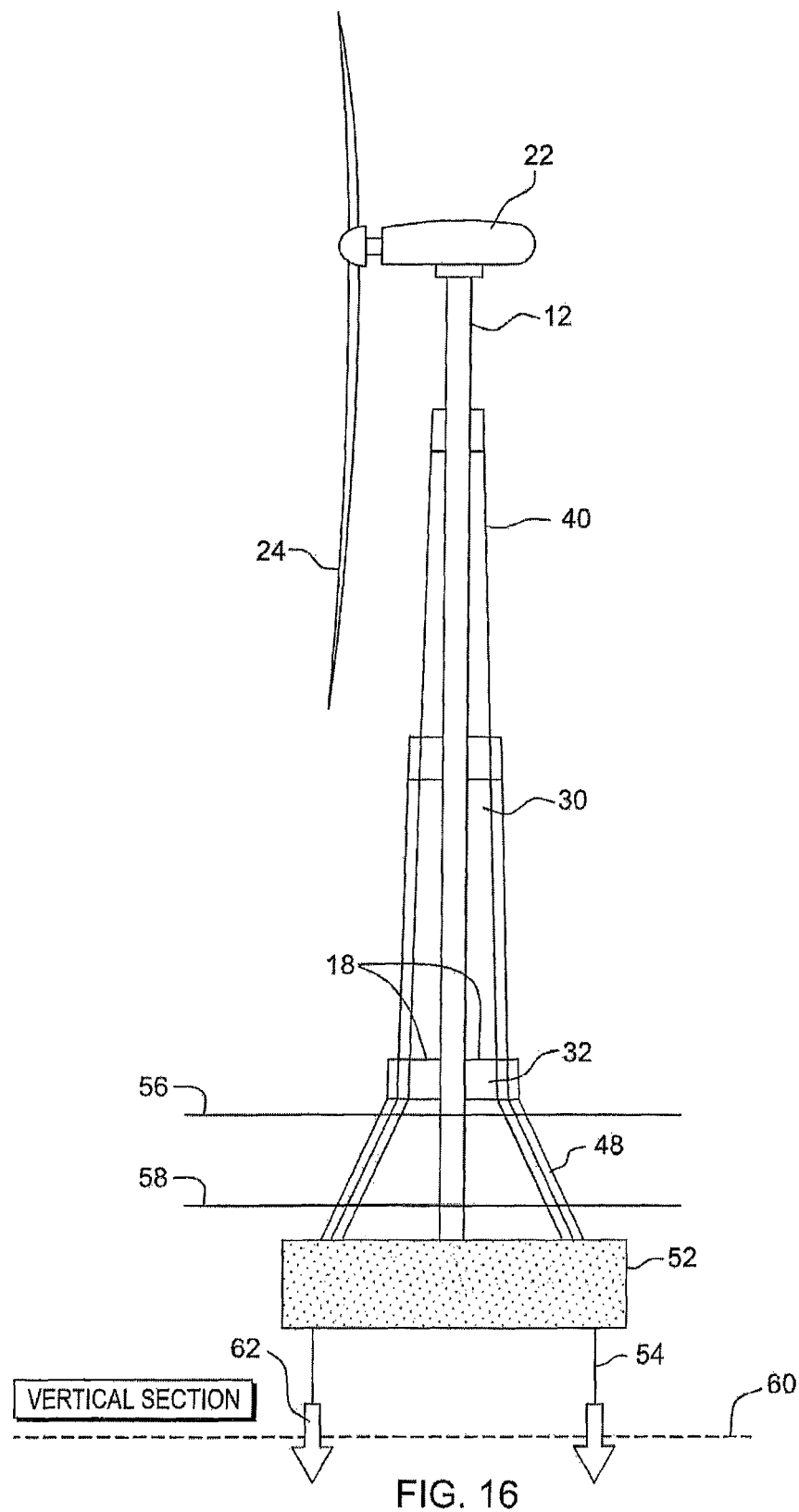
FIG. 16 is a vertical section of a floating reduced profile wind turbine tower RPWTT 10 of the present invention for offshore use. Fanned out post-tensioned cables 48 are anchored in a submerged pontoon 52 which is held below both high water level 56 and low water level 58 by tie-down cables 54 via anchorage 62 in seabed 60.

FIG. 16 shows a floating reduced profile wind turbine tower employing a uniform spinal core 12, fanned-out post-tensioned cables 48, tie-down cables 54 and fully submerged pontoon 52. The pontoon 52 remains below the lowest expected water level 58 at all times. It provides a predetermined upward force designed to resist all gravity forces while simultaneously supplying the means against which the tower tie-down cables 54 are deliberately tensioned. This way, the user introduces a set uplift force that is independent of the actual water level and ensures that the tie-down cables 54 remain in proper tension under all design loading conditions, independent of the water level. This also reduces cable fatigue and minimizes the effect of wave forces on the tower structure. The pontoon 52 can take different forms and be constructed of different materials. The tie-down cables 54 are anchored into the seabed utilizing counterweights or soil anchorages. The post-tensioned cables 40 are fanned-out at 48 to reduce the forces in them and permit an efficient taller tower to extend deeper into the water and, in so doing, reducing the length of the tie-down cables 54. Reducing the length of the tie-down cables 54 is essential in making the floating tower effective, as long tie-down cables 54 can adversely affect the sway at the top of the tower and, in turn, the tower performance as a whole.

Tie-down cables 54 have been used effectively in floating structures for many years. Tension Leg Platforms (TLPs) utilizing vertical tie-down cables have been employed in floating oil rig construction for almost three decades. However, unlike most floating structures, which typically are low-rise, heavy, with a comparatively wide base, and are subjected to relatively small overturning moments, a wind tower is, in essence, a high-rise structure with a relatively light weight and narrow base and is subjected to substantial overturning moments. Consequently, the external overturning moments at the tower base translate into large axial forces in the tie-down cables 54, leading to considerable elongation and shortening of these cables that cannot be ignored in wind tower applications. As water depth increases, the length of the tie-down cables 54, which hold down the tower and anchor it into the seabed, increases, as well. As a result, the differential elongation and shortening of these cables under external overturning moments increases and, in turn, the sway at the top of the tower becomes significantly larger.

Figure 16A:
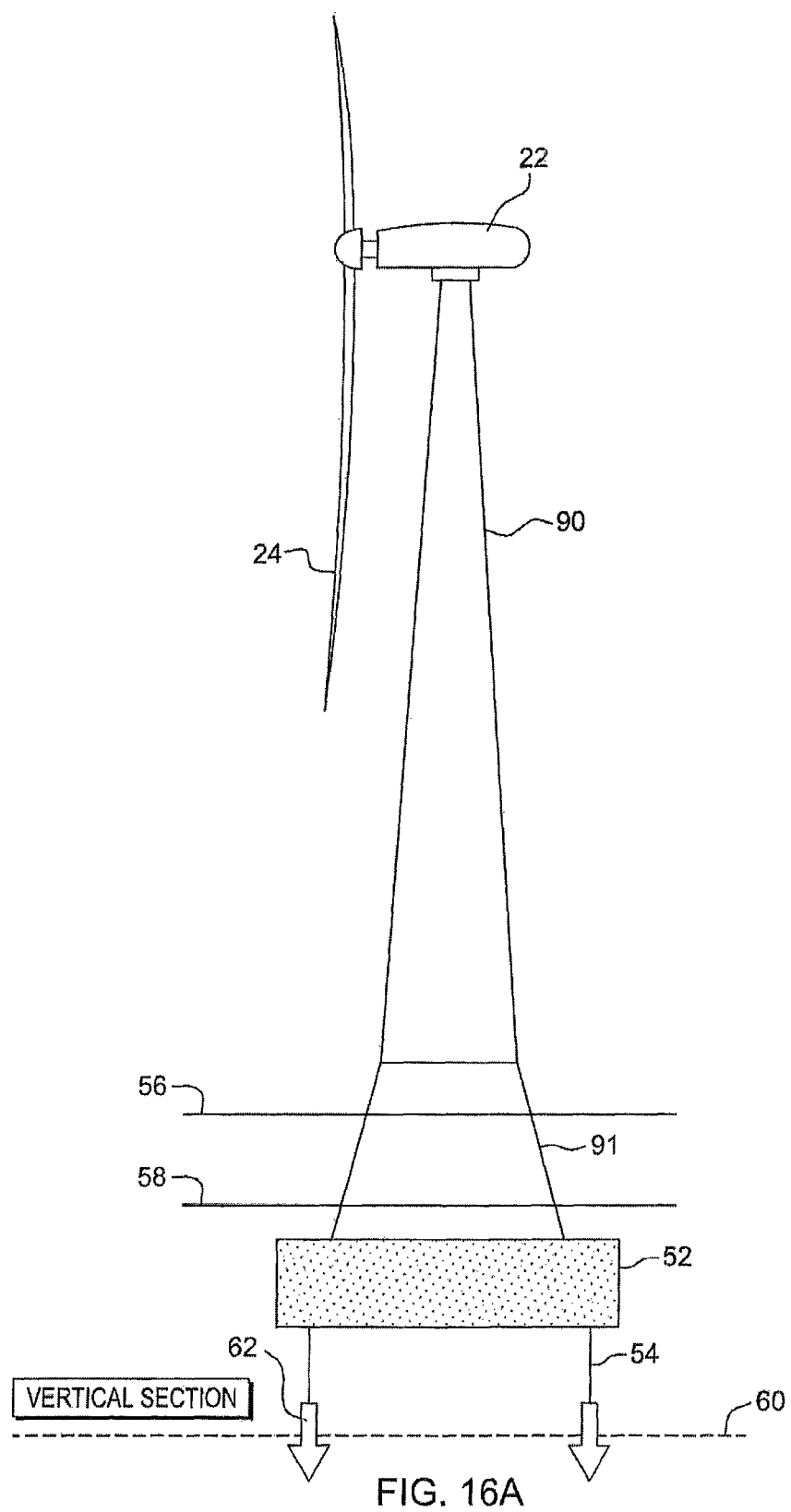
FIG. 16A is a vertical section of a floating wind turbine tower of prior art construction (either tapered tube or lattice type or hybrids thereof) 90, with new, optional fanned out base section 91, installed on a submerged pontoon, as is the reduced profile wind turbine tower RPWTT 10 of FIG. 16.

With a pontoon 52 that is basically hinged in the water and with a relatively narrow tower base, the changes in tie-down cable length can be magnified several-fold in the form of sway at the top of the wind tower. Such large sway would adversely affect the tower performance. Large sway can also increase the overturning moments at the tower base, as the contribution of the tower gravity loads to the overturning moment in a swayed tower position becomes of substantial magnitude. The taller the tower, the narrower the horizontal distance between the tie-down cables 54, and the longer the tie-down cables 54 become, the more significant the effect of the tie-down cables 54 elongation and shortening on the sway at the top of the tower. To keep the cable elongation and shortening within acceptable limits, the diameter of these cables must become larger and/or the horizontal distance between the tie-down cables 54 need to get wider. This solution, of course, has its economical limits. An effective method to address this problem is to construct a taller tower and sink it deeper into water to shorten the length of the tie-down cables 54. Although conventional towers using tapered lattice or tapered tube structure 90 as in FIG. 16A can utilize this new method, there is advantage to using this new method with the reduced profile towers of this invention. Unlike today's tower, where a taller tower requires a structure of a larger diameter at substantially higher costs, a reduced profile wind turbine tower, by fanning out the tower post-tensioned cables 48 or tubular arms 34 below water, can be made taller and sunk deeper into water at relatively minimal marginal extra costs.

The entire floating reduced profile wind turbine tower can be pre-assembled on shore, then floated and towed fully assembled together with its pontoon 52 to its final destination offshore, where it would be permanently anchored into the seabed. In this way, the massive and costly monopole foundation, gravity base, or jacket structure used in today's towers are completely eliminated.

Figure 17:
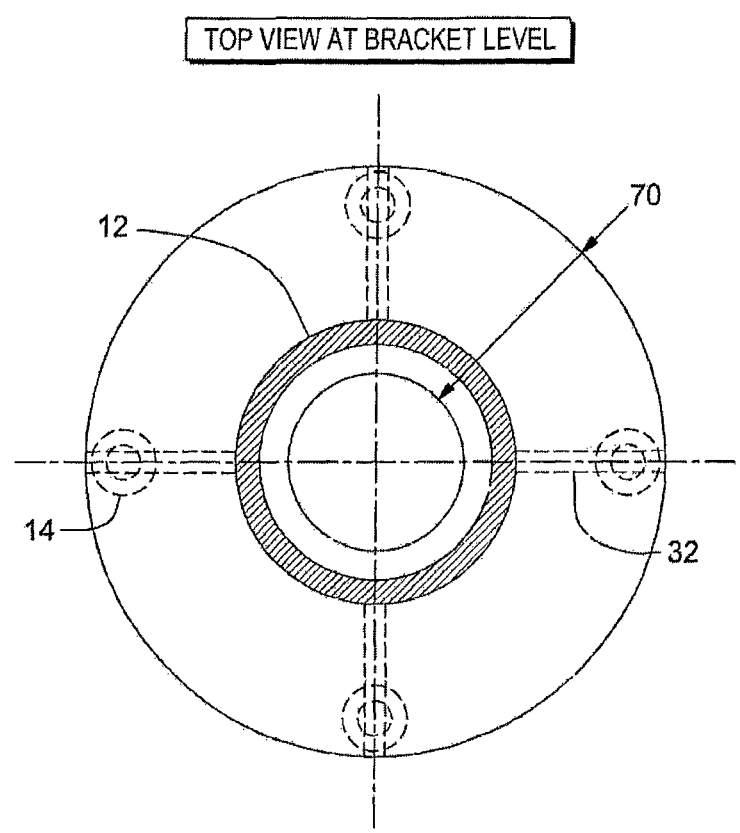
FIG. 17 is a top view of a reduced profile wind turbine tower RPWTT 10 of the present invention at the bracket level showing the detail of the field connections between uniform spinal core 12, tubular arms 14, rigid brackets 32 and top circular flange plate 70.
Figure 18:
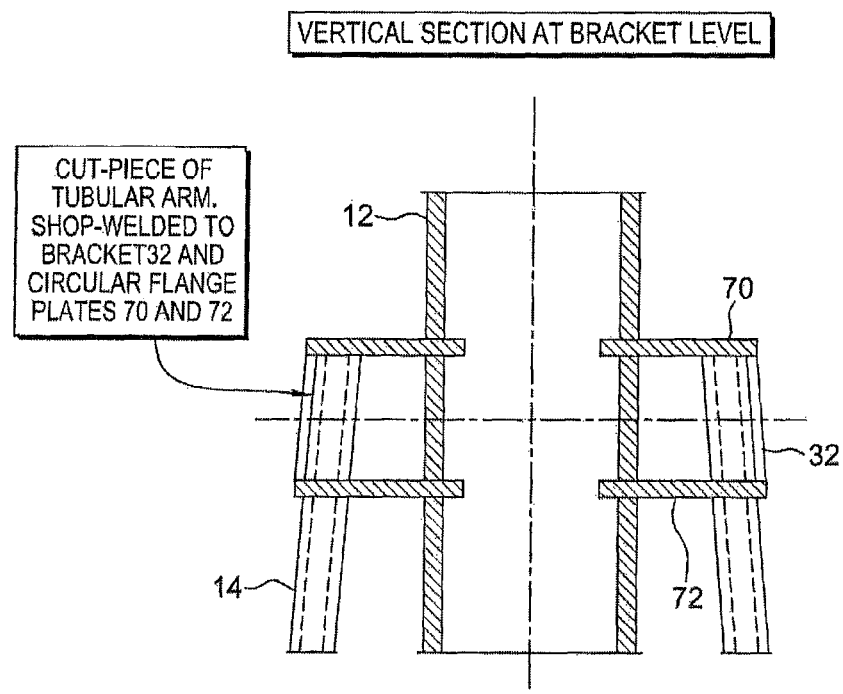
FIG. 18 is a vertical section of the reduced profile wind turbine tower RPWTT 10 of the present invention at bracket level showing the details of the field connections of FIG. 17 from a view point 90 degrees away.
Figure 19:
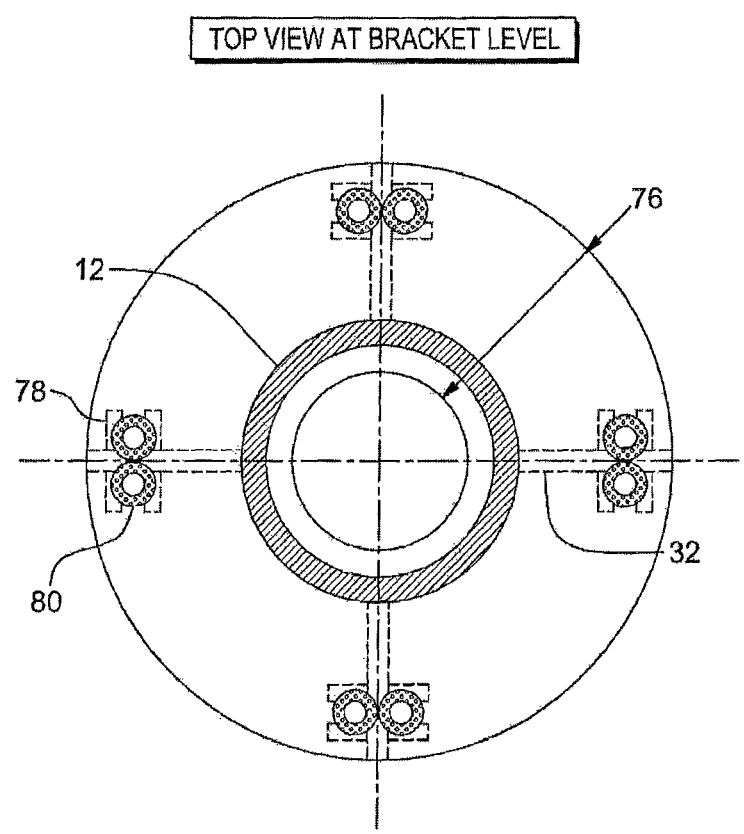
FIG. 19 is a top view of the reduced profile wind turbine tower RPWTT 10 of the present invention at the bracket level (comparable to FIG. 17) showing the detail of the field connections between uniform spinal core 12, cable assemblies 86, rigid brackets 32, and top circular flange plate 76.
Figure 20:
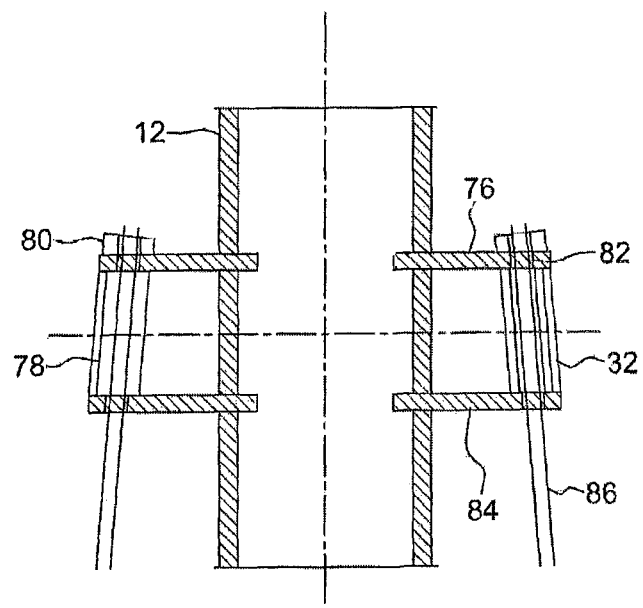
FIG. 20 is a vertical section of the reduced profile wind turbine tower RPWTT 10 of the present invention at bracket level of the field connections of FIG. 19 from a view point 90 degrees away.

FIGS. 17-20 show the details of alternate embodiments for field connections at the bracket level for both tubular arm embodiments (as shown in FIGS. 17-18), as well as post-tensioned cable embodiments (as shown in FIGS. 19-20).

FIGS. 17 and 18 should be viewed together. These connections are shown as field welded, but they can be designed as field bolted, as well. Spinal core 12 is welded to both top circular flange plate 70, as well as bottom circular flange plate 72. Tubular arms 14 are field welded to bottom circular flange plate 72, while cut pieces of the tubular arm are shop welded to bracket 32 and flange plates 70 and 72.

In corresponding views of FIGS. 19 and 20, top circular flange plate 76 and bottom circular flange plate 84 are field welded to spinal core 12. Shop welded stiffeners 78 are welded to both top and bottom flange plates and to bracket 32. Cable assemblies 86 go through openings 82 in top and bottom flange plates 76 and 84.

To summarize, this invention transforms today's single component tower 5, into three general components: a spinal core 12, axially-loaded tubular arms 14, and shear wings 16 which join all three components to work as one unit in resisting the external forces and moments imposed on the tower. The tubular arms 14 are braced by the spinal core through bracing rings 17 or 26. In the reduced profile wind turbine tower 10 of the present invention, the spinal core 12 resists a small portion of the external moments, while the tubular arms resist the larger part of these moments. The tubular arms components are primarily axially-loaded. As the user introduces openings 28 in the shear wings, circular flange plates 18 are added to reinforce the shear wings and to brace the tubular arms 14. As the user increases the size of the shear wing openings, the shear wings are reduced to strong rigid brackets with pairs of circular flange plates 18, which together with the tubular arms form the bracket sub-system that resists the larger part of the external moments imposed on the tower. The system may be supported by a foundation on land or on a pontoon in water. In a general variation, post-tensioned cables 40 are used to replace the tubular arms 14. Both the tubular arms and the post-tensioned cables work in a similar manner, interacting with the core 12 through rigid brackets 32 and their pairs of flange plates 18; the difference is that the cables must be tensioned. The distance between the spinal core and the tubular arms or post-tensioned cables may be enlarged to increase the efficiency of the resisting system of the reduced profile wind turbine tower 10 of the present invention. The spinal core, the bracket assembly, and the pontoon, may be constructed from any material that can resist the forces and moments imposed on them. While tubes are shown herein for the tubular arms, the tubular arms can be constructed of any standard-profile-cross-section.

CONCLUSION

The reduced profile wind turbine tower RPWTT 10 is a versatile and structurally potent pioneering system that reverses today's tower limitations, presents superior performance and offers significant advantages that translate into exceptionally efficient and cost-effective wind towers. The reduced profile wind turbine tower RPWTT 10 innovation completely transforms today's wind tower and unlocks new possibilities for taller and slimmer wind towers that are easier and faster to fabricate, transport, and install.

The reduced profile wind turbine tower system offers many advantages in the fabrication and erection of wind towers. Actual cost savings from utilizing the reduced profile wind turbine tower system depends on the project-specific situation, geotechnical conditions, and the specific reduced profile wind turbine tower system employed. With a uniform and smaller tower core, the fabrication and erection of reduced profile wind turbine tower can advance faster and at lower costs. There are fewer connections and a smaller number of tower core segments to be handled and put together. Accordingly, fitting, welding, bolting, monitoring, and testing are considerably reduced. In addition, steel plate rolling, cutting and waste, as well as surface preparation and painting of the tower, are dramatically cut. With pre-compression introduced into the tower core 12 by the post-tensioned cables 40, the tower core 12 can be constructed of pipe sections bearing on one another and confined by external and internal rings, thereby simplifying installation and reducing construction time. The core 12 can be constructed of suitable structural materials, such as, for example, steel or concrete—precast concrete, cast-in-place, or post-tensioned concrete or a hybrid thereof. The slimmer and lighter reduced profile wind turbine tower core 12 resolves the transportation limitations of today's tower and requires a smaller and less costly crane for erection. In addition, the brackets 32 with their circular flange plates 18 are able to provide a sturdy stage to support a climbing tower crane to erect the next tower level, as well as facilitate the installation of the turbine 22 and blades 24, thereby avoiding the need for a larger and much costlier land-staged crane.

The slimmer profile of the reduced profile wind turbine tower RPWTT 10 diminishes the visual impact of today's wind towers. This is an important advantage that can ease objections from environmental groups to offshore wind farms and allow the construction of wind towers closer to shore. Given its slimmer profile, the new tower 10 would "disappear" from view faster than any other tower installed to date. All known floating wind towers use today's land-based tapered-tube structure and attempt to float and stabilize it in the water. No known structural system has sought to float a wind tower and at the same time produce a slimmer, non-tapered tower with effective control of its movement. The floating reduced profile wind turbine tower completely eliminates the massive and costly monopole foundation, gravity base, or jacket structure used in today's tower installations. As shown, a floating reduced profile wind turbine tower can be pre-assembled on shore, then floated and towed fully assembled to its final destination offshore.

Today's prior art tower 5 offers only a single structural solution: a free-standing cantilever restrained at its base. As a result, today, optimization of the wind power system cannot be performed on the wind power system as a whole. In sharp contrast, the reduced profile wind turbine tower RPWTT 10 design allows for the numerous variations of towers and permits several variables to interact in optimizing the entire wind power generating system to include the tower structure 10, turbine 22, and blades 24. In this way, the reduced profile wind turbine tower RPWTT 10 unlocks previously untapped potential for reducing total expenditures and lowering the unit cost of energy.

The reduced profile wind turbine tower RPWTT 10 innovation permits economical and efficient super tall wind towers capable of harnessing more powerful winds at higher altitudes, thereby advancing wind energy projects far beyond their current limitations. It transforms wind power, both land-based and offshore, into a less expensive resource and offers new possibilities for efficiently harnessing the abundant wind energy onshore, offshore, and further out at sea. The distinctive, wide-ranging, and vital advantages outlined herein present a major breakthrough that will indeed propel reduced profile wind turbine tower RPWTT 10 to become the tower of choice for the future.

It is to be understood that the aforementioned drawings and description are merely illustrative of the present invention, and that no limitations are intended to the detail of construction or design herein shown, other than as defined in the appended claims.

I claim:

1. A reduced profile wind turbine tower comprising:
    said reduced profile wind turbine tower having a foundation adapted to be either mounted in ground (20, 42, 46) or immersed in water (52);
    a uniform outside diameter non-tapered cylindrical spinal core (12) supported directly on said foundation and extending up vertically directly from said foundation;
    a nacelle (22) mounted on a top end of said uniform outside diameter non-tapered cylindrical spinal core (12);
    wind turbine blades (24) extending out from said nacelle (22);
    said uniform outside diameter non-tapered cylindrical spinal core carrying all needed utility lines from said nacelle and providing protected access inside said uniform outside diameter non-tapered cylindrical spinal core; and
    tubular arms (14) supported by and extending up directly from said foundation distributed around and using spaced rigid brackets (32) and pairs of spaced circular flange plates (18) extending from said tubular arms over a length thereof for providing stiffness of said tower and for reducing and modifying the bending moments imposed on said uniform outside diameter non-tapered cylindrical spinal core;
    said tubular arms comprise a plurality of axially loaded tubular arms (14) surrounding said uniform outside diameter non-tapered cylindrical spinal core (12) spaced therefrom, anchoring in said foundation (20, 42, 46) and extending up directly from said foundation (20, 42, 46) either vertically or sloped and terminating substantially adjacent said nacelle (22) to resist both tension and compression forces imposed thereon and to substantially reduce the bending moments on said uniform outside diameter non-tapered cylindrical spinal core (12);
    said spaced rigid brackets (32) and said pairs of spaced circular flange plates (18) extending out from said uniform outside diameter non-tapered cylindrical spinal core (12); and
    said pairs of spaced circular flange plates (18) provide lateral bracing of said plurality of axially loaded tubular arms (14), wherein said spaced rigid brackets (32) and said pairs of spaced circular flange plates (18) engage the plurality of axially loaded tubular arms (14) and provide a stage for a climbing crane to facilitate the erection of the uniform outside diameter non-tapered cylindrical spinal core (12), the nacelle (22) and the wind turbine blades (24);
    in which said plurality of axially loaded tubular arms (14) are fanned-out at their lower portions for reducing anchoring forces into said foundation (20, 42, 46).

2. The tower of claim 1 wherein said reduced profile wind turbine tower is enclosed, at least partially, by a taut tenting sheath.

3. The tower of claim 1 wherein said tower is made of materials selected from the group consisting of steel, cast-in-place concrete, pre-cast concrete, post-tensioned concrete, or a hybrid thereof.

4. The tower of claim 1 wherein horizontal tubes (36) are provided to join lower ends of said plurality of axially loaded tubular arms (14) for cancelling out horizontal force components created by fanned-out portions of said plurality of axially loaded tubular arms (14).

5. A reduced profile wind turbine tower comprising:
    said reduced profile wind turbine tower having a foundation adapted to be immersed in water (52);
    a uniform outside diameter non-tapered cylindrical spinal core (12) supported directly on said foundation and extending up vertically directly from said foundation;
    a nacelle (22) mounted on a top end of said uniform outside diameter non-tapered cylindrical spinal core (12);
    wind turbine blades (24) extending out from said nacelle (22);
    said uniform outside diameter non-tapered cylindrical spinal core carrying all needed utility lines from said nacelle and providing protected access inside said uniform outside diameter non-tapered cylindrical spinal core; and
    tubular arms (14) supported by and extending up directly from said foundation distributed around and using spaced rigid brackets (32) and pairs of spaced circular flange plates (18) extending from said tubular arms over a length thereof for providing stiffness of said tower and for reducing and modifying the bending moments imposed on said uniform outside diameter non-tapered cylindrical spinal core;
    said foundation of said wind turbine tower is a pontoon (52) being submerged in a body of water;
    said uniform outside diameter non-tapered cylindrical spinal core (12) extending up vertically from the submerged pontoon (52);
    said submerged pontoon (52) being arranged for being anchored by tie-down cables (54), said tie-down cables (54) are arranged for being anchored at or into a seabed (60);
    said tubular arms comprising a plurality of axially loaded tubular arms (14) surrounding said uniform outside diameter non-tapered cylindrical spinal core (12)

spaced therefrom, anchoring in said submerged pontoon (52) and extending up from said submerged pontoon (52) either vertically or sloped and terminating substantially adjacent said nacelle (22) to resist both tension and compression forces imposed thereon and to substantially reduce the bending moments on said uniform outside diameter non-tapered cylindrical spinal core (12);

said spaced rigid brackets (32) and pairs of spaced circular flange plates (18) extending out from said uniform outside diameter non-tapered cylindrical spinal core (12), wherein said pairs of spaced circular flange plates (18) provide lateral bracing of said plurality of axially loaded tubular arms (14), wherein said spaced rigid brackets (32) and pairs of spaced circular flange plates (18) engage the plurality of axially loaded tubular arms (14) and provide a stage for a climbing crane to facilitate the erection of the uniform outside diameter non-tapered cylindrical spinal core (12), the nacelle (22) and the wind turbine blades (24); and wherein the plurality of axially loaded tubular arms (14) are fanned-out at their lower portions for reducing anchoring forces into said submerged pontoon (52).

6. The tower of claim 5 wherein said tower is enclosed, at least partially, by a taut tenting sheath.

7. The tower of claim 5 wherein said tower is made of materials selected from the group consisting of steel, cast-in-place concrete, pre-cast concrete, post-tensioned concrete, or a hybrid thereof.

8. The tower of claim 5 wherein horizontal tubes (36) are provided to join lower ends of said plurality of axially loaded tubular arms (14) for cancelling out horizontal force components created by fanned-out portions of said plurality of axially loaded tubular arms (14).

\* \* \* \* \*